(12) United States Patent
Gupta et al.

(10) Patent No.: US 12,395,930 B2
(45) Date of Patent: Aug. 19, 2025

(54) ROBUSTNESS AND POWER SAVING FOR A STEREO VOICE BACK CHANNEL IN AN EXTENDED PERSONAL AREA NETWORK

(71) Applicant: QUALCOMM Incorporated, San Diego, CA (US)

(72) Inventors: Hemant Gupta, Hyderabad (IN); Mayank Batra, Cambridge (GB); Sriman Miryala, Hyderabad (IN); Richard Cardoe, Fen Drayton (GB)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/158,626

(22) Filed: Jan. 24, 2023

(65) Prior Publication Data

US 2024/0251347 A1    Jul. 25, 2024

(51) Int. Cl.
| | |
|---|---|
| H04W 52/00 | (2009.01) |
| H04R 1/10 | (2006.01) |
| H04R 5/033 | (2006.01) |
| H04R 5/04 | (2006.01) |
| H04S 1/00 | (2006.01) |
| H04W 52/02 | (2009.01) |

(52) U.S. Cl.
CPC ...... *H04W 52/0216* (2013.01); *H04R 1/1016* (2013.01); *H04R 5/033* (2013.01); *H04R 5/04* (2013.01); *H04S 1/007* (2013.01); *H04R 2420/07* (2013.01)

(58) Field of Classification Search
CPC ............................ H04W 52/0216; Y02D 30/70
See application file for complete search history.

(56) References Cited

U.S. PATENT DOCUMENTS

| | | | |
|---|---|---|---|
| 2008/0232430 A1* | 9/2008 | Batey | H04B 1/3805 |
| | | | 375/E1.001 |
| 2008/0233978 A1* | 9/2008 | Batey | H04M 1/05 |
| | | | 455/41.2 |
| 2016/0192114 A1* | 6/2016 | Sole | H04L 65/65 |
| | | | 455/41.3 |
| 2016/0330635 A1* | 11/2016 | Chhabra | H04W 76/30 |
| 2017/0064625 A1* | 3/2017 | Sampath | H04W 52/0216 |
| 2019/0045438 A1* | 2/2019 | Cariou | H04W 52/0229 |

(Continued)

OTHER PUBLICATIONS

"Zigbee-Based Low Power Consumption Wearables Device for Voice Data Transmission"; AlShuhail et al.; Sustainability; Aug. 2022 (Year: 2022).*

*Primary Examiner* — Benjamin H Elliott, IV

(74) *Attorney, Agent, or Firm* — Harrity & Harrity, LLP

(57) ABSTRACT

Various aspects of the present disclosure generally relate to wireless communication. In some aspects, a wireless communication device may transmit, to one or more peripheral devices, downlink audio packets associated with a left audio channel and a right audio channel during a service period associated with a target wake time (TWT) service interval (SI) periodicity, wherein the TWT SI periodicity is a first integer multiple of a base SI periodicity. The wireless communication device may receive, from the one or more peripheral devices, uplink audio packets associated with a voice back channel (VBC) during a service period associated with a VBC SI periodicity, wherein the VBC SI periodicity is a second integer multiple of the base SI periodicity. Numerous other aspects are described.

30 Claims, 15 Drawing Sheets

(56) References Cited

U.S. PATENT DOCUMENTS

| | | | |
|---|---|---|---|
| 2022/0116870 A1* | 4/2022 | Cariou | H04W 76/15 |
| 2022/0141680 A1* | 5/2022 | Min | H04W 28/02 |
| 2022/0201533 A1* | 6/2022 | Sehgal | H04W 52/0216 |
| 2022/0343829 A1* | 10/2022 | Min | G06F 3/14 |
| 2022/0369224 A1* | 11/2022 | Al Jurdi | H04B 1/719 |
| 2022/0394635 A1* | 12/2022 | Min | H04W 88/02 |
| 2023/0262604 A1* | 8/2023 | Choi | H04W 52/0235 370/311 |
| 2024/0146793 A1* | 5/2024 | Elsherif | H04L 65/65 |
| 2024/0221742 A1* | 7/2024 | Yun | G10L 25/63 |
| 2024/0251347 A1* | 7/2024 | Gupta | H04S 1/007 |

\* cited by examiner

ROBUSTNESS AND POWER SAVING FOR A STEREO VOICE BACK CHANNEL IN AN EXTENDED PERSONAL AREA NETWORK

FIELD OF THE DISCLOSURE

Aspects of the present disclosure generally relate to wireless communication and to techniques and apparatuses associated with increased robustness and power savings for a stereo voice back channel (VBC) in an extended personal area network.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via a downlink (e.g., the communication link from the AP to the device) and an uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a wireless communication device. The method may include transmitting, to one or more peripheral devices, downlink audio packets associated with a left audio channel and a right audio channel during a service period associated with a target wake time (TWT) service interval (SI) periodicity, wherein the TWT SI periodicity is a first integer multiple of a base SI periodicity. The method may include receiving, from the one or more peripheral devices, uplink audio packets associated with a voice back channel (VBC) during a service period associated with a VBC SI periodicity, wherein the VBC SI periodicity is a second integer multiple of the base SI periodicity.

Some aspects described herein relate to a wireless communication device. The wireless communication device may include a memory and one or more processors coupled to the memory. The one or more processors may be configured to transmit, to one or more peripheral devices, downlink audio packets associated with a left audio channel and a right audio channel during a service period associated with a TWT SI periodicity, wherein the TWT SI periodicity is a first integer multiple of a base SI periodicity. The one or more processors may be configured to receive, from the one or more peripheral devices, uplink audio packets associated with a VBC during a service period associated with a VBC SI periodicity, wherein the VBC SI periodicity is a second integer multiple of the base SI periodicity.

Some aspects described herein relate to a non-transitory computer-readable medium that stores a set of instructions for wireless communication by a wireless communication device. The set of instructions, when executed by one or more processors of the wireless communication device, may cause the wireless communication device to transmit, to one or more peripheral devices, downlink audio packets associated with a left audio channel and a right audio channel during a service period associated with a TWT SI periodicity, wherein the TWT SI periodicity is a first integer multiple of a base SI periodicity. The set of instructions, when executed by one or more processors of the wireless communication device, may cause the wireless communication device to receive, from the one or more peripheral devices, uplink audio packets associated with a VBC during a service period associated with a VBC SI periodicity, wherein the VBC SI periodicity is a second integer multiple of the base SI periodicity.

Some aspects described herein relate to an apparatus for wireless communication. The apparatus may include means for transmitting, to one or more peripheral devices, downlink audio packets associated with a left audio channel and a right audio channel during a service period associated with a TWT SI periodicity, wherein the TWT SI periodicity is a first integer multiple of a base SI periodicity. The apparatus may include means for receiving, from the one or more peripheral devices, uplink audio packets associated with a VBC during a service period associated with a VBC SI periodicity, wherein the VBC SI periodicity is a second integer multiple of the base SI periodicity.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
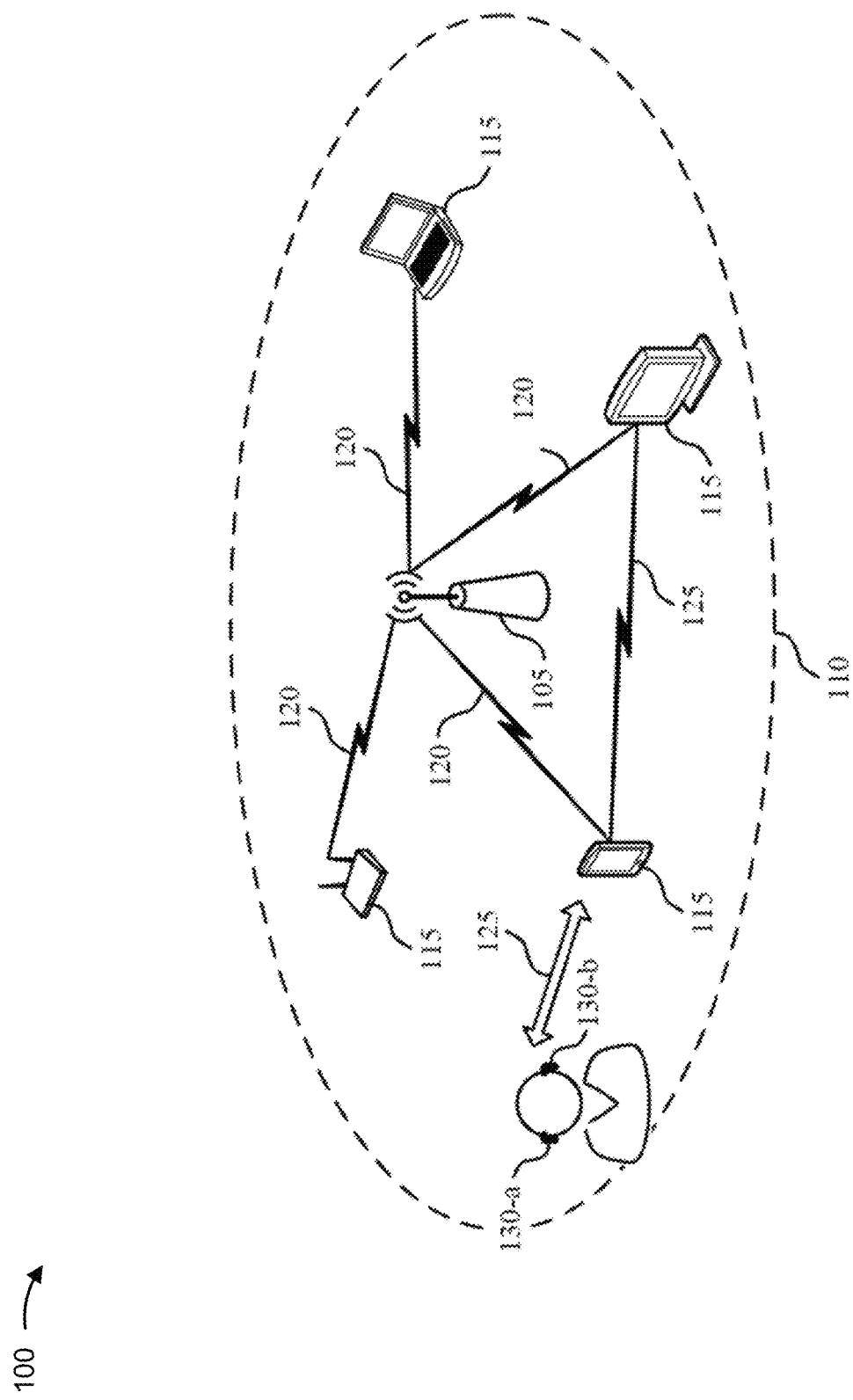
FIG. 1 illustrates a wireless communication system, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of wireless communication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a wireless communication device may support applications associated with low-latency or lossless audio to one or more other devices, such as one or more personal audio devices. For example, a wireless communication device may support applications and use cases associated with ultra-low latency (ULL), such as ULL gaming, or streaming lossless audio to one or more personal audio devices (e.g., peripheral devices) of a user. In scenarios in which a user uses two peripheral devices, the wireless communication device may support an extended personal audio network (XPAN) via which the wireless communication device may communicate with the two peripheral devices. For example, to meet latency or lossless criteria associated with an application or use case, XPAN devices may employ a target wake time (TWT) technique for communication between the wireless communication device and the peripheral devices. For example, as described herein, a TWT in an XPAN use case is a coordinated time period when an access point (AP) and a station (STA) will be awake and communicating data associated with the XPAN use case, and the AP and STA may otherwise enter a low power mode to save power outside the TWT. Furthermore, in an XPAN use case, a wireless local area network (WLAN) or a Wi-Fi network is generally used as a transport to transmit Bluetooth audio data, which may enable high-performance features such as high bandwidth audio streaming, lossless audio providing whole home coverage, and/or ULL gaming that cannot be provided using Bluetooth.

However, although an XPAN implementation can support applications associated with very low latency requirements or lossless audio streaming, challenges may arise in various XPAN cases where there may be a need to support a voice back channel (VBC). For example, in a ULL gaming use case, a handset acting in a soft access point (SAP) role may transmit downlink audio data (e.g., including audio associated with the game and/or voice data from other players) to one or more peripheral devices (e.g., wireless earbuds), and a VBC from the one or more peripheral devices to the handset or SAP may be used to transmit uplink audio data to the handset or SAP such that the user can speak with friends while playing the game. In order to support VBC use cases, however, current XPAN implementations generally use a fixed TWT service interval (SI) of four milliseconds (ms) and a fixed TWT service period (SP) of two ms that is used for initial transmission of downlink audio traffic for left and right channels, retransmissions of the downlink audio traffic, initial transmission of uplink VBC traffic for left and right channels, retransmissions of the uplink VBC traffic, and corresponding random backoff (RBO) and block acknowledgements associated with WLAN or Wi-Fi protocols. Accordingly, current XPAN designs that support a VBC are highly congested, with multiple downlink and uplink packets being handled in a short 2 ms TWT SP, which can raise potential issues of robustness and increased power consumption, especially in noisy or congested environments.

Some aspects described herein relate to techniques to increase robustness and power savings for a stereo VBC in an XPAN. For example, in an XPAN use case that supports a VBC, such as a ULL gaming session, downlink audio traffic may be transmitted from a handset or SAP device to one or more peripheral devices (e.g., left and right wireless earbuds) in a downlink audio SI, and uplink VBC traffic may be transmitted from the peripheral device(s) to the handset or SAP device in an uplink VBC SI, where the downlink audio SI is a first integer multiple of a base SI and the uplink VBC SI is a second integer multiple of the base SI. For example, the base SI may be 4 ms, the uplink VBC SI may have a fixed duration of 16 ms, and the downlink audio SI may be 4, 8, or 16 ms. In this way, robustness may be increased for both the downlink audio traffic and the uplink VBC traffic associated with the XPAN use case, as the handset or SAP device may have more opportunities to retransmit downlink traffic because the peripheral devices have a separate VBC SI for transmitting uplink VBC traffic and the peripheral device(s) may have more opportunities to retransmit uplink VBC traffic in respective TWT SI slots. Furthermore, in some aspects, a WLAN component associated with the handset or SAP device may use a self-learning algorithm to accurately determine an arrival pattern for incoming VBC packets, which may increase robustness by accurately scheduling reception of the incoming VBC packets by the handset or SAP device and save power by allowing the handset or SAP device to adjust an SP duration and enter a low power mode when no incoming VBC packets are expected. In addition, to enable further power savings, a handset or SAP device in an XPAN use case may initially operate in a power saving mode until the handset or SAP device receives an indication that a VBC use case has started (e.g., a user indication to enable a microphone). In this way, the handset or SAP device may conserve power when no VBC packets are expected, and may use the self-learning algorithm to anticipate the VBC traffic pattern after the VBC use case has started.

FIG. 1 illustrates a wireless communication system 100 (also known as a wireless local area network (WLAN) or a Wi-Fi network), in accordance with the present disclosure. The wireless communication system 100 may include an AP 105 and multiple associated devices 115 (such as stations (STAs) or SAPs), which may correspond to electronic devices such as mobile stations, personal digital assistants (PDAs), handheld devices, netbooks, notebook computers, tablet computers, laptops, display devices (e.g., TVs and/or computer monitors), printers, or the like. The AP 105 and the associated devices 115 (e.g., associated STAs) may represent a basic service set (BSS) or an extended service set (ESS). The various devices 115 in the network may communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple Aps 105 to be connected in an ESS.

Although not shown in FIG. 1, a device 115 may be located in an intersection of more than one coverage area 110 and may associate with more than one AP 105. A single AP 105 and an associated set of devices 115 may be referred to as a BSS. An ESS is a set of connected BSSs. A distribution system (not shown) may be used to connect Aps 105 in an ESS. In some cases, the coverage area 110 of an AP 105 may be divided into sectors (also not shown). The wireless communication system 100 may include Aps 105 of different types (e.g., metropolitan area, home network, or the like), with varying and/or overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections. Devices 115 and Aps 105 may communicate according to the WLAN radio and baseband protocol for physical and MAC layers from IEEE 802.11 and versions including 802.11b, 802.11g, 802.11a, 802.11n, 802.11ac, 802.11ad, 802.11ah, 802.11ax, or the like. In other implementations, peer-to-peer connections or ad hoc networks may be implemented within wireless communication system 100.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipments (UEs), STAs, mobile stations, PDAs, handheld devices, netbooks, notebook computers, tablet computers, laptops, and/or other suitable devices. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, and/or valves, among other examples.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-oriented (SCO) links (or SCO connections), extended synchronous connection-oriented (eSCO) links (or eSCO connections), and/or other logical transport channel links. For example, a Bluetooth connection may be an eSCO connection for voice calls (e.g., which may allow for retransmission), an asynchronous connection-oriented link (ACL) connection for music streaming (e.g., using an advanced audio distribution profile (A2DP)), or the like. eSCO packets may be transmitted in predetermined time slots (e.g., six Bluetooth slots each for eSCO). The regular interval between the eSCO packets may be specified when the Bluetooth link is established. The eSCO packets to and/or from a specific device (e.g., paired device 115) are acknowledged and may be retransmitted if not acknowledged during a retransmission window. In addition, audio may be streamed between a device 115 and a paired device 115 using an ACL connection (e.g., using the A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range) and/or a human interface device (HID) profile (e.g., providing low latency links with low power requirements). Further, in an XPAN configuration, BLE audio may be used (e.g., rather than basic rate (BR) and/or enhanced data rate (EDR) Classic audio) to establish point-to-point connections between a soft access point (SAP) (e.g., a handset) and one or more peripheral devices (e.g., wireless earbuds).

In some examples, a device 115 may support both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases, the AP 105 may be associated with a coverage area, which may represent a BSA.

Devices 115 and Aps 105 may communicate according to the WLAN radio and baseband protocol for physical and MAC layers from IEEE 802.11 and versions including 802.11b, 802.11g, 802.11a, 802.11n, 802.11ac, 802.11ad, 802.11ah, 802.11ax, or the like. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, and/or other data exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio with one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-a and a wireless earbud 130-b), the wireless communication device may support an extended personal area network (XPAN) via which the wireless communication device may communicate with the two peripheral devices.

As indicated above, FIG. 1 is provided as an example. Other examples may differ from what is described with regard to FIG. 1.

Figure 2:
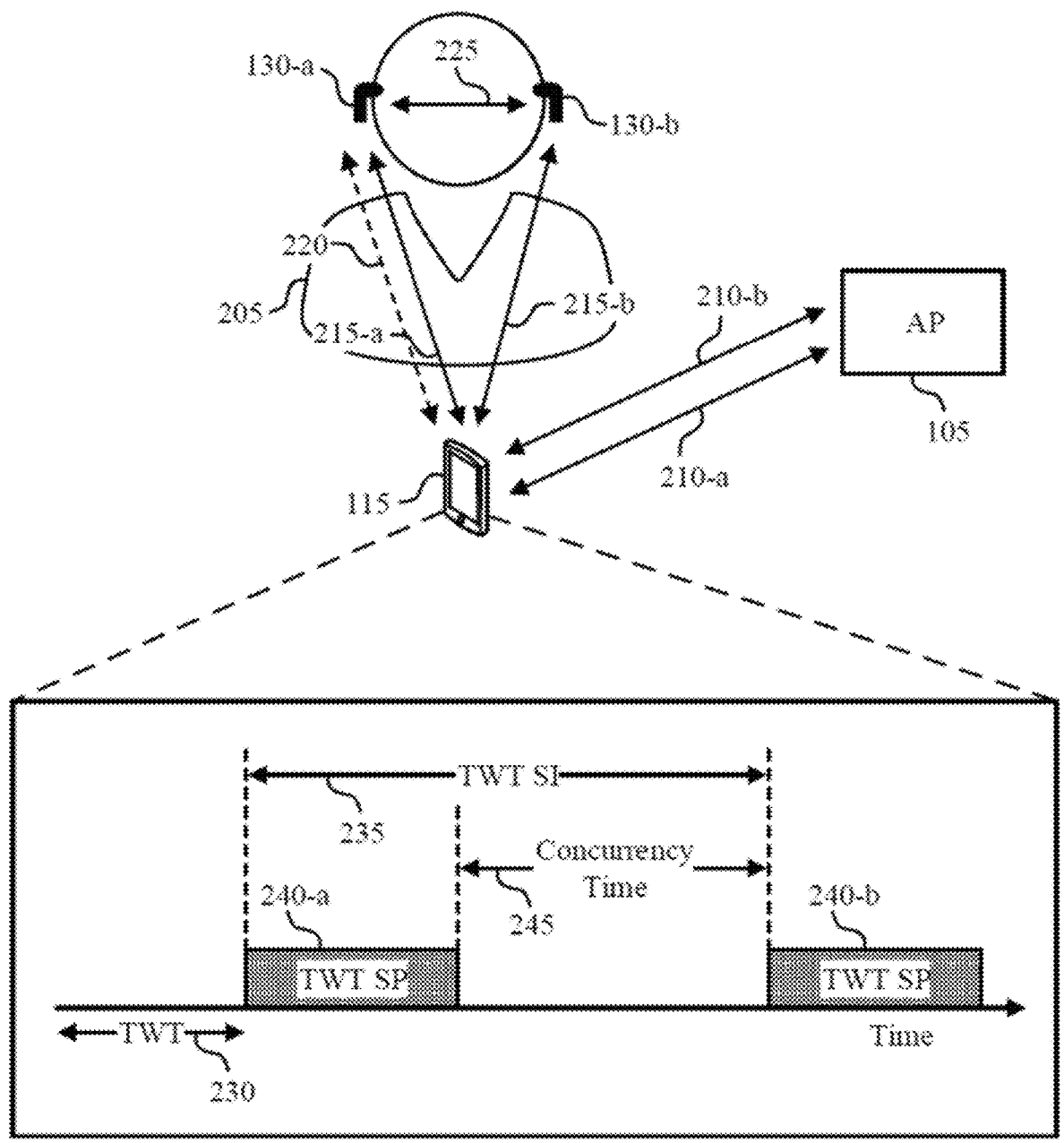
FIG. 2 illustrates an example of a wireless communication system that supports increased robustness and power savings for a stereo voice back channel (VBC) in an extended personal area network (XPAN), in accordance with the present disclosure.

FIG. 2 illustrates an example of a wireless communication system 200 that supports increased robustness and/or power savings for a stereo VBC in an XPAN, in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and peripheral devices 130, including (in the illustrate example) a wireless earbud 130-a and a wireless earbud 130-b of a user 205 (e.g., examples of audio devices and/or peripheral devices), which may be examples of corresponding devices as illustrated by and described with reference to FIG. 1. In some implementations, the device 115, the wireless earbud 130-a, and the wireless earbud 130-b may support a signaling-based mechanism according to which the device 115 may transmit an indication of a set of updated parameters to each of the wireless earbud 130-a and the wireless earbud 130-b via one or more audio data packets.

In some deployments, the device 115 may communicate with the AP 105 via one or both of a link 210-a or a link 210-b, which may be examples of infrastructure links between the AP 105 and the device 115. The link 210-a may be an example of a 2.4 GHz link between the AP 105 and the device 115, and the link 210-b may be an example of a 5 GHz link or a 6 GHz link between the AP 105 and the device 115. Further, the device 115 may communicate wirelessly with each of the wireless earbud 130-a and the wireless earbud 130-b, where each of the wireless earbud 130-a and the wireless earbud 130-b may be associated with an XPAN of the device 115. For example, the device 115 may communicate with the wireless earbud 130-a via a link 215-a and may communicate with the wireless earbud 130-b via a link 215-b, where the link 215-a and the link 215-b may be referred to or understood as XPAN links. The link 215-a may be an example of a 5 GHz link or a 6 GHz link and the link 215-b may be an example of a 5 GHz link or a 6 GHz link. Additionally, in some examples, the device 115 may communicate with the wireless earbud 130-a, which may be an example of a primary earbud, via a communication link 220. The communication link 220 may be an example of a Bluetooth link between the device 115 and the wireless earbud 130-a. The wireless earbud 130-a and the wireless earbud 130-b, which may be an example of a secondary earbud, may communicate with each other via a link 225, which may be an example of a Bluetooth link between the wireless earbud 130-a and the wireless earbud 130-b.

In some cases, the device 115, the wireless earbud 130-a, and the wireless earbud 130-b may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-a and the wireless earbud 130-b (e.g., personal devices of the device 115). For such applications, the device 115 may be expected to keep end-to-end latency below a relatively stringent latency target (e.g., 40 ms for ULL gaming). Further, the device 115 may also be tasked with handling coexistence of XPAN traffic (e.g., traffic to or from one or both of the wireless earbud 130-a and the wireless earbud 130-b) with other concurrency scenarios that the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless earbud 130-a and the wireless earbud 130-b, and/or power and concurrency constraints at the device 115, the device 115 may employ a TWT technique for the communication between the device 115 (which may act or function as an SAP) and each of the wireless earbud 130-a and wireless earbud 130-b (which may act or function as STAs).

Example TWT parameters include a TWT 230, a TWT service interval (SI) 235, and a TWT service period (SP) 240. A TWT 230 may indicate or be associated with a timing synchronization function (TSF) time indicating a start or beginning of a first TWT service period. A TWT SI 235 may indicate a TWT interval, which may refer to a time difference between a start or beginning of two consecutive TWT service periods. A TWT service period (SP) 240 may indicate a duration during which one or both of the wireless earbud 130-a and the wireless earbud 130-b are awake during a TWT SI 235. In some aspects, a TWT SP 240 may be referred to or understood as a TWT session. As illustrated in FIG. 2, the TWT SI 235 may indicate a time difference between a TWT SP 240-a and a TWT 240-b. A remainder of time within a TWT SI 235 excluding a TWT SP 240 may be referred to or understood as a concurrency time 245, during which the device 115 may perform any operations (e.g., transmission or reception) associated with a concurrency scenario at the device 115. In other words, the difference between XPAN TWT SI 235 and XPAN TWT SP 240 may be the time left for the device 115 to support other concurrencies (e.g., outside of any channel switching or software overheads).

For XPAN, each of the wireless earbud 130-a and the wireless earbud 130-b (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

As indicated above, FIG. 2 is provided as an example. Other examples may differ from what is described with regard to FIG. 2.

Figure 3:
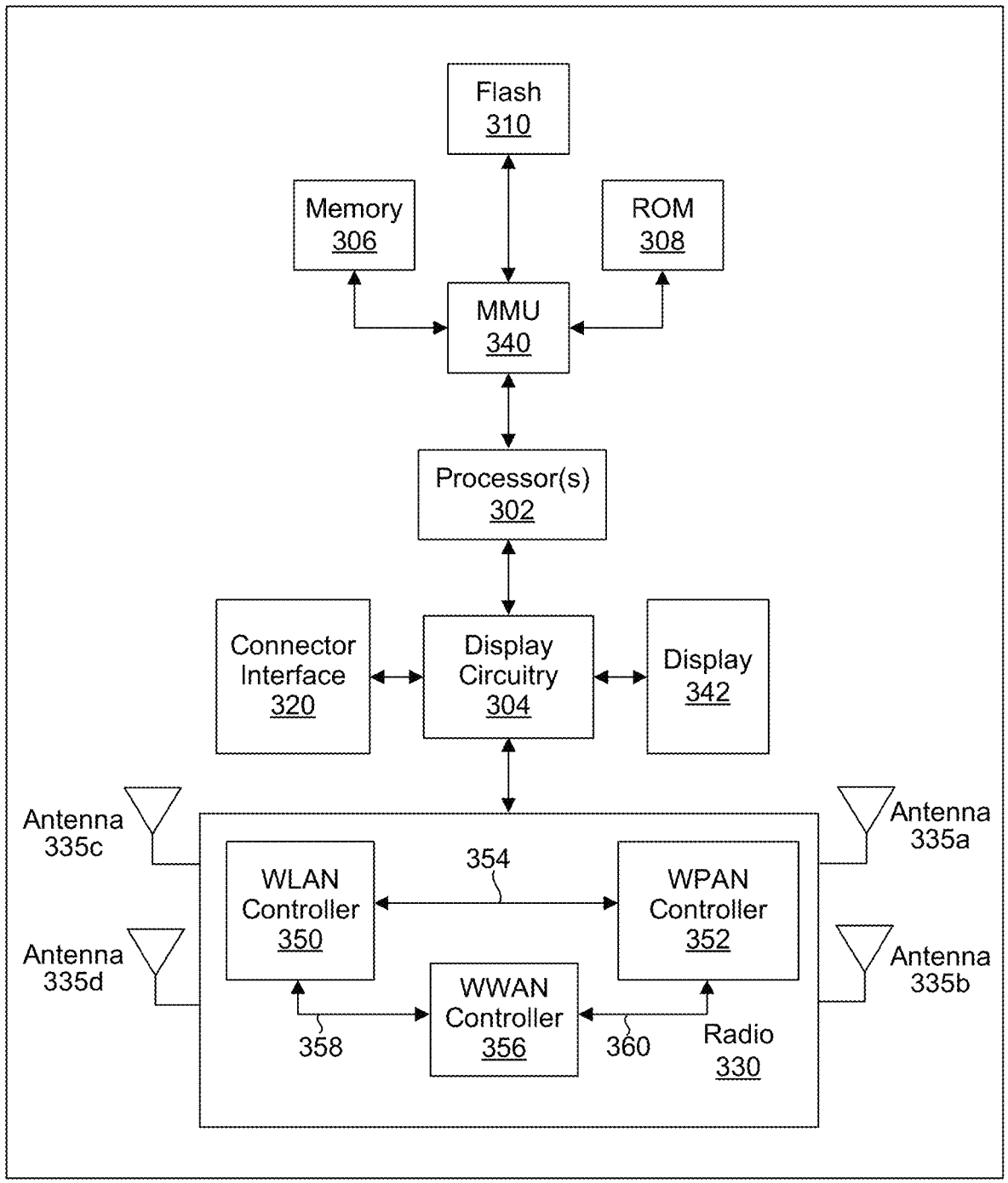
FIG. 3 is a diagram illustrating an example of a wireless communication device, in accordance with the present disclosure.

FIG. 3 is a diagram illustrating an example of a wireless communication device 300, in accordance with the present disclosure. In some aspects, the wireless communication device 300 may be an example of the AP 105, device 115, and/or wireless earbud 130 described above. In some aspects, the AP 105, device 115, and/or wireless earbud 130 may include one or more wireless communication devices 300 and/or one or more components of wireless communication device 300.

As shown in FIG. 3, the wireless communication device 300 may include a processing element, such as processor(s) 302, which may execute program instructions for the wireless communication device 300. The wireless communication device 300 may also include a display 342 that can perform graphics processing and present information to a user. The processor(s) 302 may also be coupled to memory management unit (MMU) 340, which may be configured to receive addresses from the processor(s) 302 and translate the addresses to address locations in memory such as memory 306, ROM 308, or flash memory 310 and/or to address locations in other circuits or devices, such as the display circuitry 304, radio 330, connector interface 320, and/or display 342. The MMU 340 may also be configured to perform memory protection and page table translation or set up. In some aspects, the MMU 340 may be included as a portion of the processor(s) 302.

The processor(s) 302 may be coupled to other circuits of the wireless communication device 300. For example, the wireless communication device 300 may include various memory types, a connector interface 320 through which the wireless communication device 300 can communicate with the computer system, and wireless communication subsystems that can transmit data to, and receive data from, other devices based on one or more wireless communication standards or protocols. For example, in some aspects, the wireless communication subsystems may include (but are not limited to) a WLAN subsystem, a WPAN subsystem, and/or a cellular subsystem (such as a Long-Term Evolution (LTE) or New Radio (NR) subsystem). The wireless communication device 300 may include multiple antennas 335a, 335b, 335c, and/or 335d for performing wireless communication with, for example, wireless communication devices in a WPAN.

The wireless communication device 300 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In certain aspects, the radio 330 may include separate controllers configured to control communications for various respective radio access technology (RAT) protocols. For example, as shown in FIG. 3, radio 330 may include a WLAN controller 350 that manages WLAN communications, a WPAN controller 352 that manages Bluetooth, BLE, and/or other suitable WPAN communications, and a wireless wide area network (WWAN) controller 356 that manages WWAN communications. In some aspects, the wireless communication device 300 may store and execute a WLAN software driver for controlling WLAN operations performed by the WLAN controller 350, a WPAN software driver for controlling WPAN operations performed by the WPAN controller 352, and/or a WWAN software driver for controlling WWAN operations performed by the WWAN controller 356.

In some aspects, a first coexistence interface 354 (such as a wired interface) may be used for sending information between the WLAN controller 350 and the WPAN controller 352. Additionally, or alternatively, in some aspects, a second coexistence interface 358 may be used for sending information between the WLAN controller 350 and the WWAN controller 356. Additionally, or alternatively, in some aspects, a third coexistence interface 360 may be used for sending information between the WPAN controller 352 and the WWAN controller 356.

In some aspects, one or more of the WLAN controller 350, the WPAN controller 352, and/or the WWAN controller 356 may be implemented as hardware, software, firmware or some combination thereof.

In some aspects, the WLAN controller 350 may be configured to communicate with a second device in a WPAN using a WLAN link using one or more, some, or all of the antennas 335a, 335b, 335c, and 335d. In other configurations, the WPAN controller 352 may be configured to communicate with at least one second device in a WPAN using one or more, some, or all of the antennas 335a, 335b, 335c, and 335d. In other configurations, the WWAN controller 356 may be configured to communicate with a second device in a WPAN using one or more, some, or all of the antennas 335a, 335b, 335c, and 335d. The WLAN controller 350, the WPAN controller 352, and/or the WWAN controller 356 may be configured to adjust a wakeup time interval and a shutdown time for the wireless communication device 300.

A short-range wireless communications protocol, such as BT, BLE, and/or BR/EDR, may include and/or may use one or more other communications protocols, for example, to establish and maintain communications links. In some aspects, the wireless communication device 300 may establish a communications link with one or more peripheral devices, such as a wireless headset or wireless earbuds, according to at least one communications protocol for short-range wireless communications. In some aspects, the communications link may include a communications link that adheres to a protocol included and/or for use with BT, BLE, BR/EDR, or the like. In one aspect, the communications link may include an asynchronous connection-oriented logical transport, sometimes referred to as an ACL link. When operating as an ACL link, the communications link may allow the wireless communication device 300 to connect or "pair" with a peripheral device. The connection is asynchronous in that the two devices may not need to synchronize, timewise, data communications between each other to permit communication of data packets via the communications link.

In some aspects, a logical link control and adaptation protocol (L2CAP) may be used within a BT protocol stack (not shown in FIG. 3 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link may include an A2DP link. For example, an A2DP link may provide a point-to-point link between a source device, such as the wireless communication device 300, and a sink device, such as the wireless earbuds 130-a and 130-b. With an A2DP link, data packets including audio may be transmitted over an ACL channel, and other information (e.g., for controlling the audio stream) may be transmitted over a separate control channel. The data packets may occur non-periodically.

In some aspects, the communications link may support synchronous logical transport mechanisms between a source device and a peripheral device. For example, the communications link 116 may include an SCO link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience. Accordingly, in some aspects, the communications link may include an eSCO link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, the wireless communication device 300 may include means for transmitting, to one or more peripheral devices, downlink audio packets associated with a left audio channel and a right audio channel during a service period associated with a TWT SI periodicity, wherein the TWT SI periodicity is a first integer multiple of a base SI periodicity and/or means for receiving, from the one or more peripheral devices, uplink audio packets associated with a VBC during a service period associated with a VBC SI periodicity, wherein the VBC SI periodicity is a second integer multiple of the base SI periodicity. In some aspects, the means for the wireless communication device 300 to perform operations described herein may include, for example, one or more of antennas 335a-335d, WPAN controller 352, WLAN controller 350, radio 330, and/or processor 302, among other examples.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
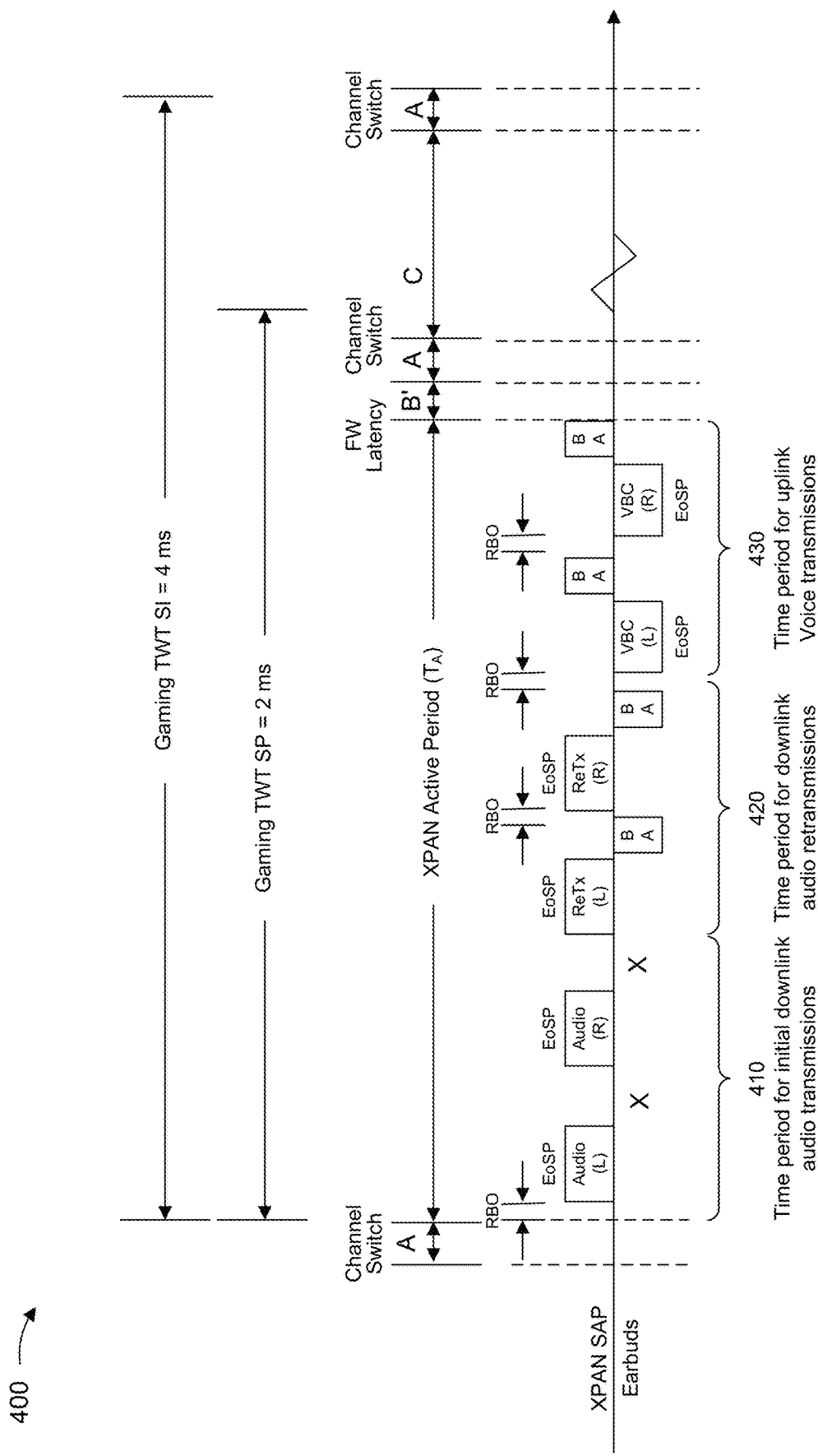
FIG. 4 is a diagram illustrating an example of over-the-air (OTA) communication associated with an XPAN use case that includes downlink audio traffic and uplink VBC traffic, in accordance with the present disclosure.

FIG. 4 is a diagram illustrating an example 400 of over-the-air (OTA) communication associated with an XPAN use case that includes downlink audio traffic and uplink VBC traffic, in accordance with the present disclosure. As shown in FIG. 4, example 400 includes communication between a first wireless communication device (e.g., AP 105 or device 115) and one or more second wireless communication devices (e.g., one or more peripheral devices, such as a wireless earbuds 130-a, 130-b). In some examples, the first wireless communication device may include an AP such as a soft AP (SAP) and the one or more second wireless communication devices may include one or more stations such as one or more peripheral devices.

As described herein, the OTA communication shown in FIG. 4 may be used to support one or more applications associated with a low-latency requirement or streaming lossless audio to one or more other devices, such as one or more personal audio devices. For example, the XPAN SAP may support applications and use cases associated with a ULL requirement, such as ULL gaming, or streaming lossless audio to one or more personal audio devices (e.g., peripheral devices). For example, to meet latency or lossless criteria associated with an application or use case, XPAN devices may employ a TWT technique for communication between the wireless communication device and the peripheral devices. For example, as described herein, a TWT in an XPAN use case is a coordinated time period when an AP and a station will be awake and communicating data associated with the XPAN use case, and the AP and STA may otherwise enter a low power mode to save power outside the TWT. Furthermore, in an XPAN use case, a WLAN or a Wi-Fi network is generally used as a transport to transmit Bluetooth audio data, which may enable high-performance features such as high bandwidth audio streaming, lossless audio providing whole home coverage, and/or ULL gaming that cannot be provided using Bluetooth.

However, although an XPAN implementation can support applications associated with very low latency requirements or lossless audio streaming, challenges may arise in various XPAN cases where there may be a need to support a VBC. For example, in a ULL gaming use case, a handset acting in the XPAN SAP role may transmit downlink audio data (e.g., including audio associated with the game and/or voice data from other players) to one or more peripheral devices (e.g., wireless earbuds), and a VBC from the one or more peripheral devices to the handset or SAP may be used to transmit uplink audio data to the handset or SAP such that the user can speak with friends while playing the game. In order to support VBC use cases, however, current XPAN implementations generally use a fixed TWT SI of four ms and a fixed TWT SP of two ms that is used for both downlink audio data (e.g., gaming audio) and uplink VBC data (e.g., user speech to be played back to friends or other users). For example, in FIG. 4, the OTA communication between the XPAN SAP and the earbuds or other peripheral devices is shown on a timeline, where blocks on the upper side of the timeline are downlink packets transmitted from the XPAN SAP to the peripheral devices and blocks on the lower side of the timeline are uplink packets transmitted from the peripheral devices to the XPAN SAP.

For example, as shown in FIG. 4, and by reference number 410, the active period of the gaming TWT SP includes a first time period for initial transmission of downlink audio traffic for left and right channels, including time periods for the peripheral devices to transmit a block acknowledgement (BA) for the downlink audio traffic (e.g., shown as "X"s in FIG. 4 to indicate that the initial transmissions of the left and right downlink audio packets were not received). Furthermore, as shown by reference number 420, the active period of the gaming TWT SP includes a time period for one or more retransmissions of the downlink audio traffic (e.g., in cases where the peripheral devices transmit a negative acknowledgement (NACK) or otherwise fail to transmit an acknowledgement (ACK) indicating successful receipt of the downlink audio traffic). In some aspects, as shown by reference number 430, the active period of the gaming TWT SP also includes a time period for initial transmission of uplink VBC traffic for left and right channels and for retransmissions of the uplink VBC traffic (e.g., not shown in FIG. 4 because the initial transmissions are received and acknowledged in BA messages transmitted by the XPAN SAP). Furthermore, as shown in FIG. 4, the TWT SP includes time periods that are used for RBO and BA associated with WLAN or Wi-Fi protocols. Accordingly, current XPAN designs that support a VBC are highly congested, with multiple downlink and uplink packets being handled in a short 2 ms TWT SP, which can raise potential issues of robustness and increased power consumption, especially in noisy or congested environments.

Some aspects described herein relate to techniques to increase robustness and power savings for a stereo VBC in an XPAN. For example, in an XPAN use case that supports a VBC, such as a ULL gaming session, downlink audio traffic may be transmitted from a handset or SAP device to one or more peripheral devices (e.g., left and right wireless earbuds) in a downlink audio SI, and uplink VBC traffic may be transmitted from the peripheral device(s) to the handset or SAP device in an uplink VBC SI, where the downlink audio SI is a first integer multiple of a base SI and the uplink VBC SI is a second integer multiple of the base SI. For example, the base SI may be 4 ms, the uplink VBC SI may have a fixed duration of 16 ms, and the downlink audio SI may be 4, 8, or 16 ms. In this way, robustness may be increased for both the downlink audio traffic and the uplink VBC traffic associated with the XPAN use case, as the handset or SAP device may have more opportunities to retransmit downlink traffic because the peripheral devices have a separate VBC SI for transmitting uplink VBC traffic and the peripheral device(s) may have more opportunities to retransmit uplink VBC traffic in respective TWT SI slots. Furthermore, in some aspects, a WLAN component associated with the handset or SAP device may use a self-learning algorithm to accurately determine an arrival pattern for incoming VBC packets, which may increase robustness by accurately scheduling reception of the incoming VBC packets by the handset or SAP device and save power by allowing the handset or SAP device to adjust a SP duration and enter a low power mode when no incoming VBC packets are expected. In addition, to enable further power savings, a handset or SAP device in an XPAN use case may initially operate in a power saving mode until the handset or SAP device receives an indication that a VBC use case has started (e.g., a user indication to enable a microphone). In this way, the handset or SAP device may conserve power when no VBC packets are expected, and may use the self-learning algorithm to anticipate the VBC traffic pattern after the VBC use case has started.

As indicated above, FIG. 4 is provided as an example. Other examples may differ from what is described with regard to FIG. 4.

Figure 5A:
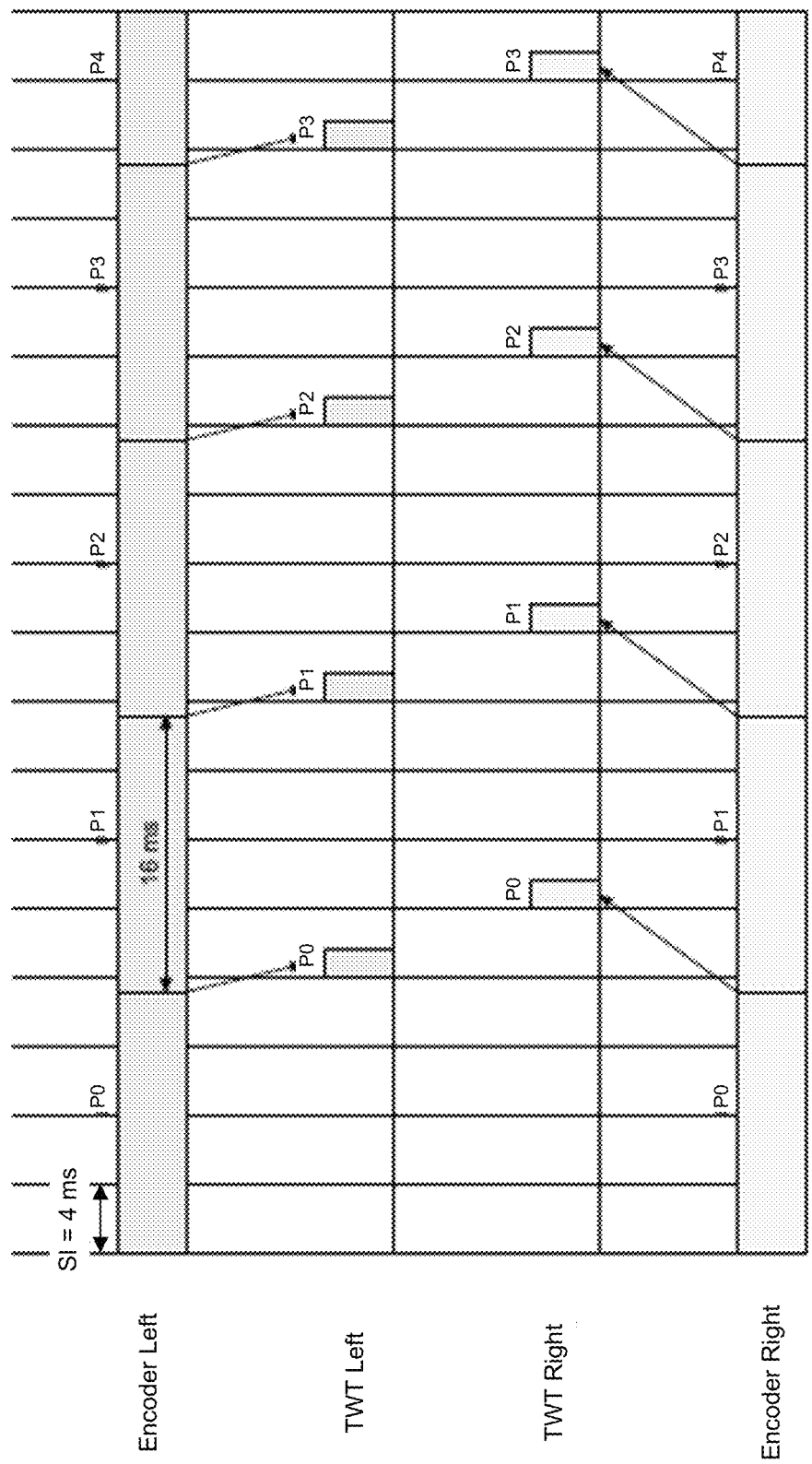
FIGS. 5A-5C are diagrams illustrating examples associated with increased robustness and/or power savings for a stereo VBC in an XPAN, in accordance with the present disclosure.
Figure 5B:
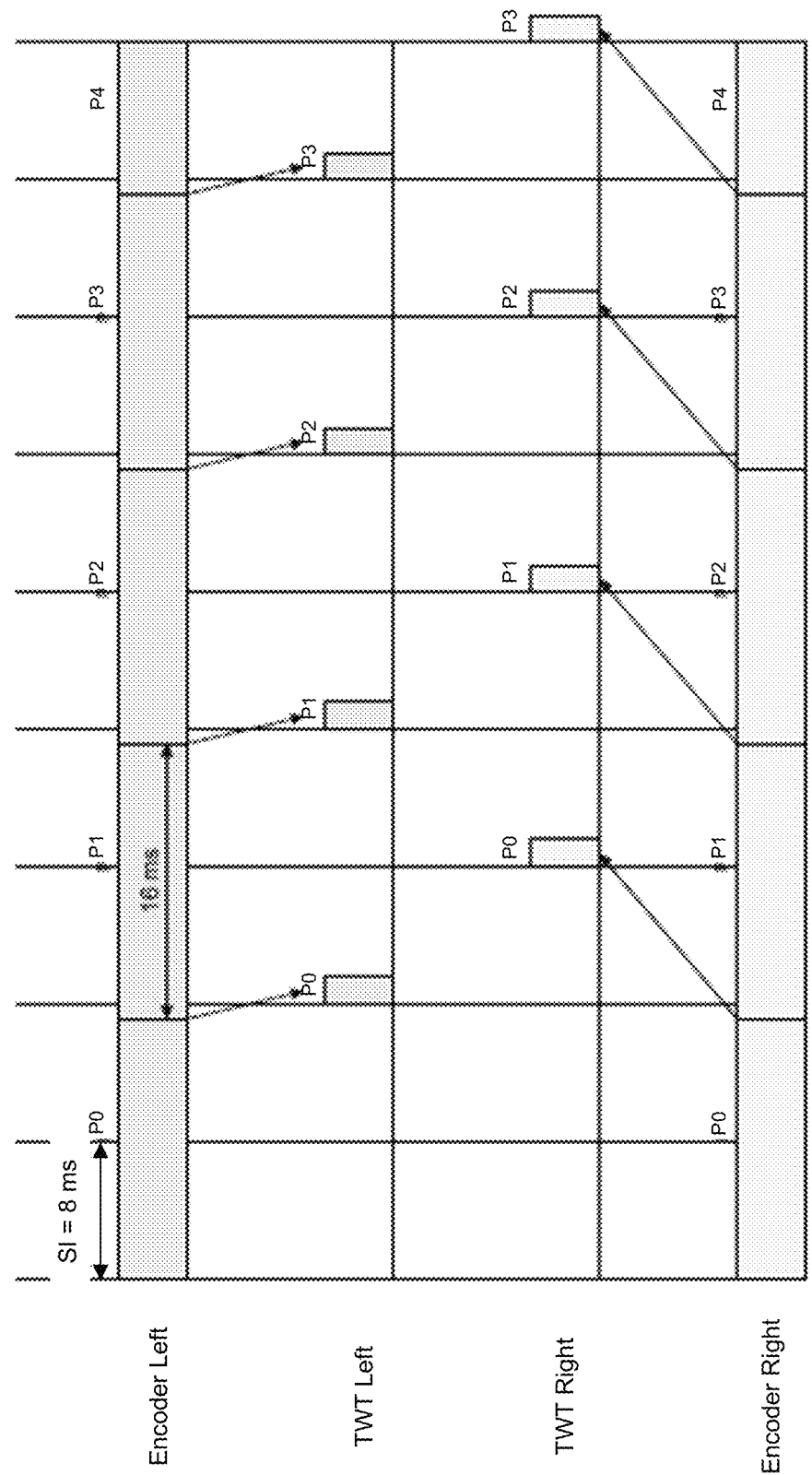
Figure 5C:
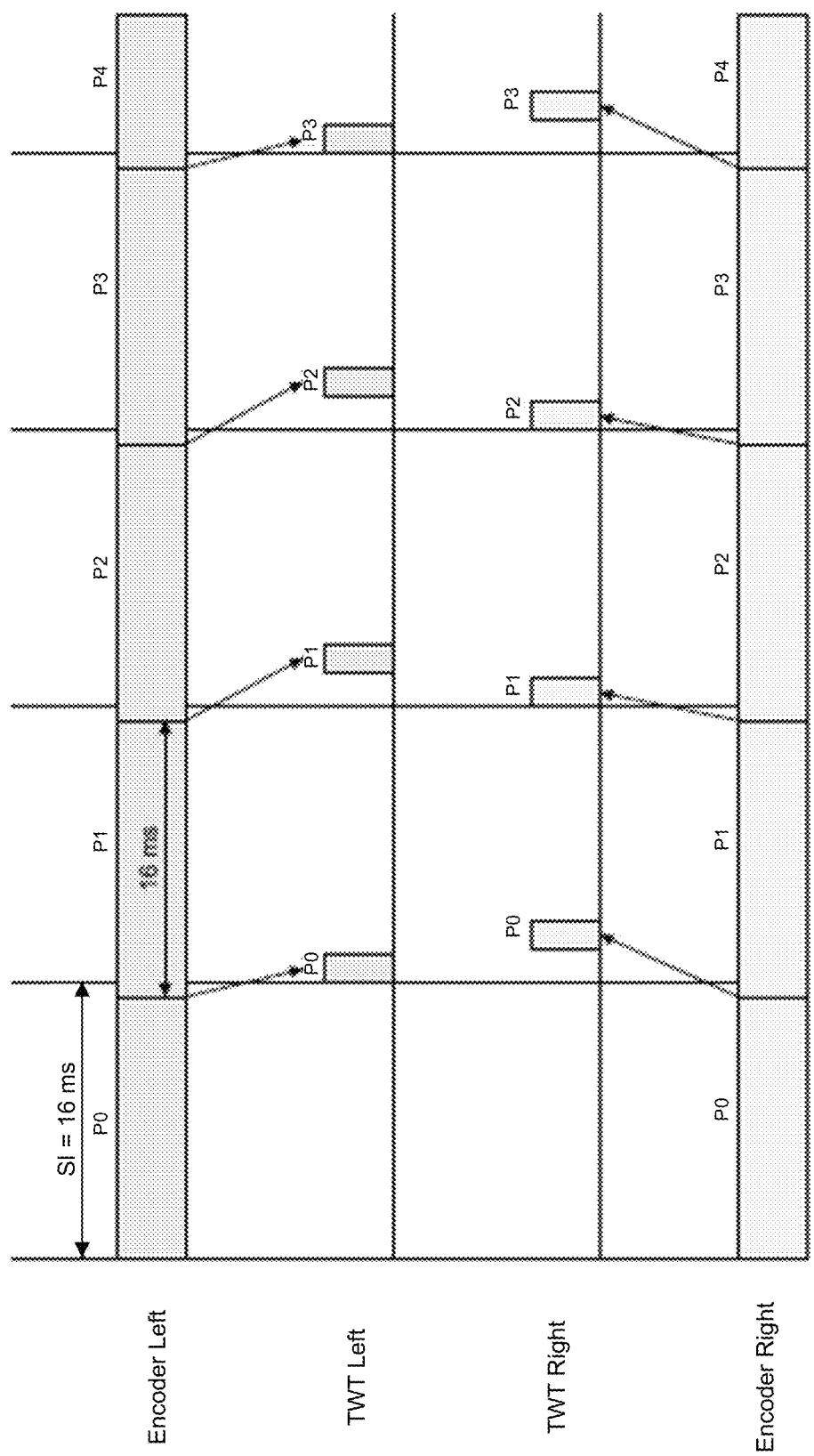

FIGS. 5A-5C are diagrams illustrating examples 500A-500C associated with increased robustness and/or power savings for a stereo VBC in an XPAN, in accordance with the present disclosure. In particular, examples 500A-500C illustrate timings that one or more peripheral devices may use to transmit uplink VBC traffic to a handset or other suitable device acting in an SAP role in an XPAN use case, where the one or more peripheral devices may correspond to a left wireless earbud and a right wireless earbud, a wireless headset that includes left and right audio channels, or the like. Furthermore, as described herein, the one or more peripheral devices may be equipped with a microphone to receive voice input that is transmitted to the SAP as uplink VBC traffic.

In some aspects, as described herein (e.g., with reference to FIG. 4), current XPAN implementations generally use a fixed TWT SI and a fixed TWT SP to support initial transmission of downlink audio traffic, retransmissions of the downlink audio traffic, initial transmission of uplink VBC traffic, retransmission of the uplink VBC traffic, and corresponding RBOs and BAs associated with WLAN or Wi-Fi protocols. Accordingly, because the existing designs provide a limited time period (e.g., two ms) to handle various traffic types, which can lead to significant congestion in a time domain, some aspects described herein may support independent SI configurations for downlink audio traffic and uplink VBC traffic in an XPAN use case that may include VBC traffic without requiring any additional WLAN or Wi-Fi protocol messaging. For example, in a gaming or other XPAN use case that includes VBC traffic, an encoder frame size used at one or more peripheral devices that receive VBC input may be set to a fixed integer multiple of a base TWT SI, which is usually four ms. For example, in some aspects, the encoder frame size used at the one or more peripheral devices may be set to 16 ms (e.g., four times the base TWT SI), and the TWT service interval used for downlink audio traffic may be equal to or a multiple of the base TWT SI. For example, when the SAP is transmitting downlink audio packets associated with left and right audio channels to the peripheral devices, the downlink audio packets may be transmitted during an SP associated with a TWT SI periodicity of 4, 8, or 16 ms, and when the peripheral devices are transmitting uplink VBC packets associated with left and right VBC data, the uplink VBC packets may be transmitted during an SP associated with a TWT SI periodicity of 16 ms. In other words, the TWT SI periodicity for the downlink audio packets is generally shorter than or equal to the TWT SI periodicity for the uplink VBC packets, and the TWT SI periodicity for the uplink VBC packets is generally longer than the base TWT SI associated with the XPAN use case. In this way, robustness may be increased for both the downlink audio traffic and the uplink VBC traffic associated with the XPAN use case, as the handset or SAP device may have more opportunities to retransmit downlink traffic because the peripheral devices have a separate VBC SI for transmitting uplink VBC traffic and the peripheral device(s) may have more opportunities to retransmit uplink VBC traffic in respective TWT SI slots.

Accordingly, in an XPAN use case that can support a VBC, an encoder frame size for the VBC may be set to a TWT SI periodicity of 16 ms, and the peripheral device(s) (e.g., earbuds) may align VBC packets with the TWT SI periodicity (e.g., every 16 ms). Furthermore, although the TWT SI periodicity for downlink audio traffic associated with left and right audio channels may be equal to or an integer multiple of the base SI (e.g., may be configured to be 4 ms, 8 ms, or 16 ms), the TWT SI periodicity for the downlink audio traffic may not exceed the TWT SI periodicity for the VBC traffic, which is a fixed integer multiple of the base TWT SI periodicity (e.g., 16 ms). Furthermore, in cases where there are separate peripheral devices for left and right audio channels (e.g., left and right earbuds), the secondary (e.g., right) earbud may align VBC packets with the primary (e.g., left) earbud, although it will be appreciated that the right earbud and left earbud may be suitably configured as the primary and secondary earbuds. Furthermore, as described herein, the peripheral devices may send VBC packets to the SAP at different offsets in cases where the TWT SI periodicity for the downlink audio packets is shorter than the TWT SI periodicity for the uplink VBC traffic. For example, when the TWT SI is 4 ms or 8 ms, the peripheral devices may send VBC packets at different offsets, where the offset may be defined as a number of TWT SIs relative to the time when VBC packets are generated. In particular, as described herein, a primary (e.g., left) peripheral device may transmit VBC packets in TWT SIs associated with an offset of zero (0), and a secondary (e.g., right) peripheral device may transmit VBC packets in TWT SIs associated with an offset of one (1).

For example, referring to FIG. 5A, example 500A illustrates a scenario where the TWT SI for downlink audio traffic is 4 ms, and the encoder size (or TWT SI periodicity for VBC traffic) is 16 ms. In the illustrated example, when a VBC sample including a left VBC sample and a right VBC sample is generated (e.g., shown as vertical lines associated with the left encoder and the right encoder), the primary peripheral device may transmit its VB packet to the SAP at offset 0 and the secondary peripheral device may transmit its VB packet to the SAP at offset 1. For example, when the TWT SI for downlink audio traffic is 4 ms, offset 0 may generally correspond to the TWT SI that is 0 ms after the first TWT SI following the time when the VBC packets are generated, offset 1 corresponds to the TWT SI that is 4 ms after the first TWT SI following the time when the VBC packets are generated, offset 2 corresponds to the TWT SI that is 8 ms after the first TWT SI following the time when the VBC packets are generated, and offset 3 corresponds to the TWT SI that is 12 ms after the first TWT SI following the time when the VBC packets are generated. In this case, the primary peripheral device may transmit VBC packets, if any, in every $0^{th}$ offset (e.g., in TWT SIs occurring at 0 ms, 16 ms, 32 ms, and so on), and the secondary peripheral device may transmit VBC packets, if any, in every $1^{st}$ offset (e.g., in TWT SIs occurring at 4 ms, 20 ms, 36 ms, and so on). In this way, the left and right peripheral devices may transmit uplink VBC packets in consecutive TWT SIs, which may improve robustness because both the SAP and the peripheral devices are aligned with respect to the time when the left and right VBC packets will be transmitted. Furthermore, although no uplink VBC retransmissions are illustrated in FIG. 5A, it will be appreciated that each TWT SI in which an uplink VBC packet is transmitted includes a time period that may be used to retransmit the uplink VBC packet. Furthermore, the uplink VBC packets may be flushed from a buffer at the peripheral device(s) at the end of the TWT SP in which the uplink VBC packets are scheduled.

Referring to FIG. 5B, example 500B illustrates a scenario where the TWT SI for downlink audio traffic is 8 ms, and the encoder size (or TWT SI periodicity for VBC traffic) is 16 ms. In a similar manner as described above, when a VBC sample including a left VBC sample and a right VBC sample is generated, the primary peripheral device may transmit its VB packet to the SAP at offset 0 and the secondary peripheral device may transmit its VB packet to the SAP at offset 1. For example, when the TWT SI for downlink audio traffic is 8 ms, offset 0 may generally correspond to the TWT SI that is 0 ms after the first TWT SI following the time when the VBC packets are generated, and offset 1 may correspond to the TWT SI that is 8 ms after the first TWT SI following the time when the VBC packets are generated. In this case, the primary peripheral device may transmit VBC packets, if any, in every 0th offset (e.g., in TWT SIs occurring at 0 ms, 16 ms, 32 ms, and so on), and the secondary peripheral device may transmit VBC packets, if any, in every 1st offset (e.g., in TWT SIs occurring at 8 ms, 24 ms, 40 ms, and so on). In this way, the left and right peripheral devices may transmit uplink VBC packets in consecutive TWT SIs, which may improve robustness because both the SAP and the peripheral devices are aligned with respect to the time when the left and right VBC packets will be transmitted. Furthermore, although no uplink VBC retransmissions are illustrated in FIG. 5B, it will be appreciated that each TWT SI in which an uplink VBC packet is transmitted includes a time period that may be used to retransmit the uplink VBC packet. Furthermore, the uplink VBC packets may be flushed from a buffer at the peripheral device(s) at the end of the TWT SP in which the uplink VBC packets are scheduled.

Referring to FIG. 5C, example 500C illustrates a scenario where the TWT SI for downlink audio traffic is 16 ms, and the encoder size (or TWT SI periodicity for VBC traffic) is also 16 ms. In this case, when the downlink audio traffic and the uplink VBC traffic are associated with the same TWT SI periodicity, the peripheral device(s) may transmit left and right VBC packets at the same offset (e.g., offset 0), and may contend for bandwidth to coordinate which packet is transmitted first. For example, as shown in FIG. 5C, the left VBC packet is transmitted before the right VBC packet in some TWT SIs (e.g., P0 and P3), and the right VBC packet is transmitted before the left VBC packet in some TWT SIs (e.g., P1 and P2). In this case, when the downlink audio traffic and the uplink VBC traffic are associated with the same TWT SI periodicity, the primary and secondary peripheral devices may each transmit VBC packets, if any, in every 0th offset (e.g., in TWT SIs occurring at 0 ms, 16 ms, 32 ms, and so on), and may contend for bandwidth to determine the order in which the left and right VBC packets are transmitted. Furthermore, although no uplink VBC retransmissions are shown in FIG. 5C, each TWT SI in which an uplink VBC packet is transmitted includes a time period that may be used to retransmit the uplink VBC packet (e.g., unallocated time periods in each TWT SI following the initial VBC transmissions, if a NACK is received and/or an ACK is not received). Furthermore, the uplink VBC packets may be flushed from a buffer at the peripheral device(s) at the end of the TWT SP in which the uplink VBC packets are scheduled.

As indicated above, FIGS. 5A-5C are provided as examples. Other examples may differ from what is described with regard to FIGS. 5A-5C.

Figure 6A:
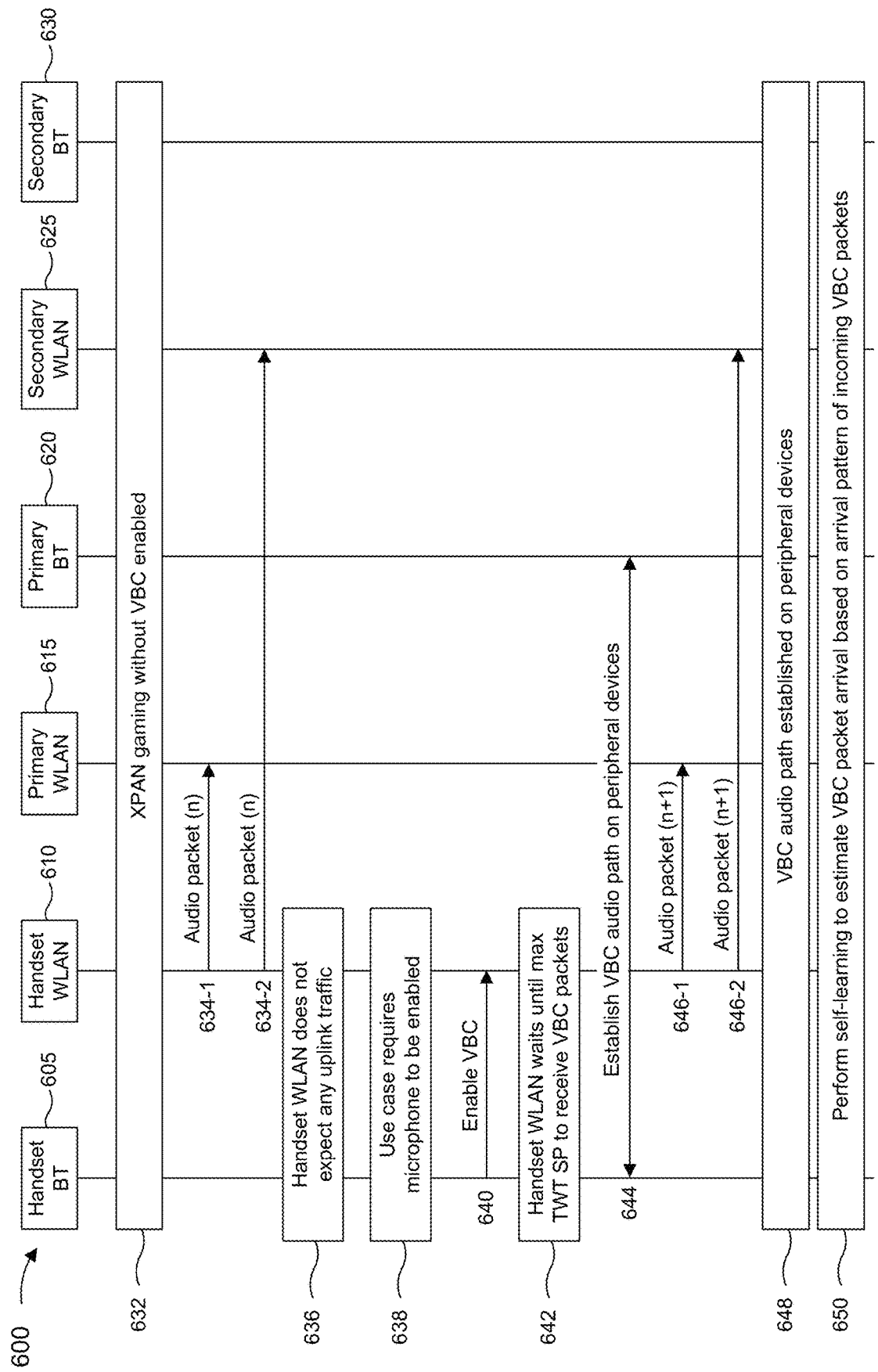
FIGS. 6A-6B are diagrams illustrating examples associated with increased robustness and/or power savings for a stereo VBC in an XPAN, in accordance with the present disclosure.
Figure 6B:
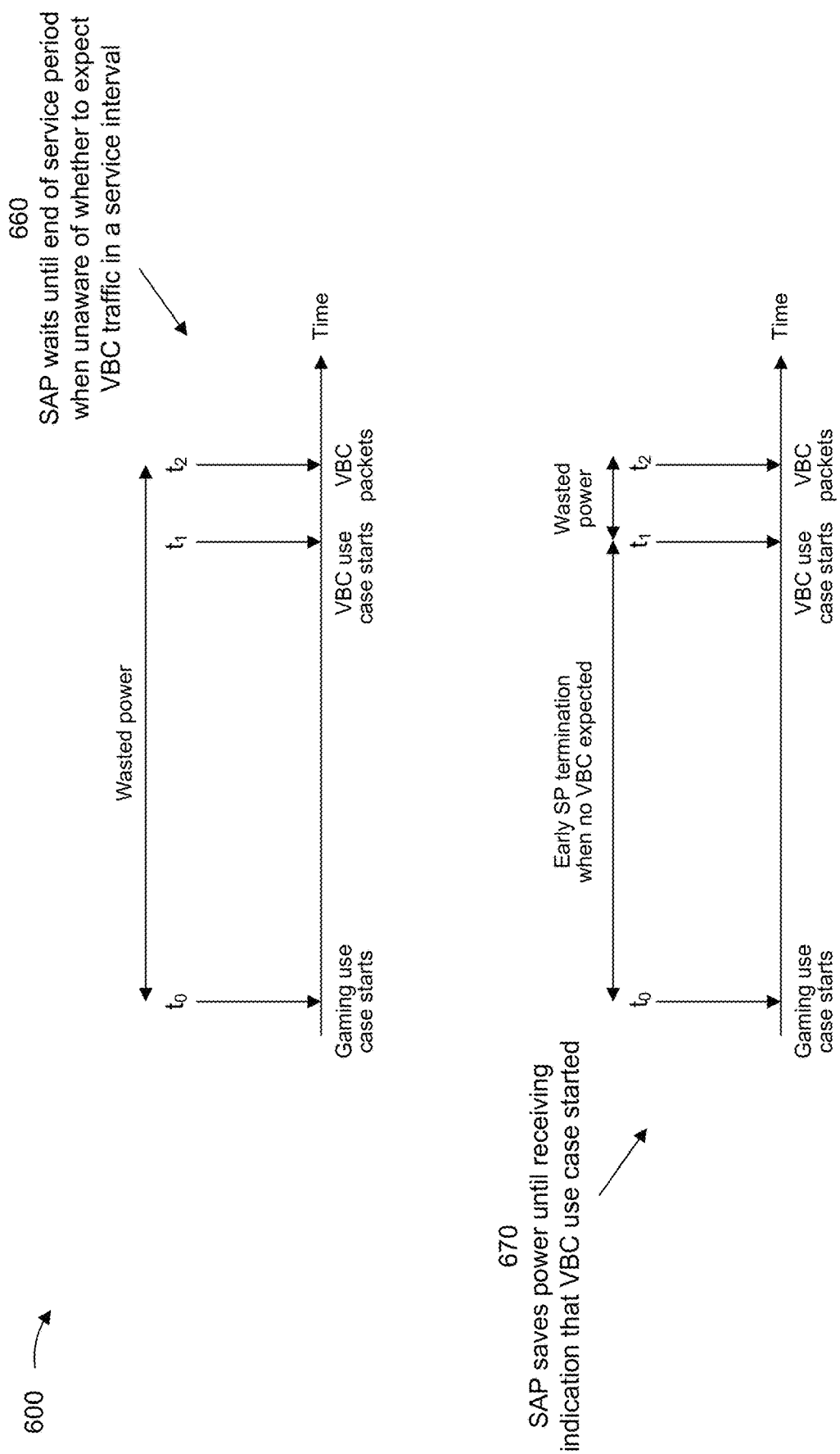

FIGS. 6A-6B are diagrams illustrating an example 600 associated with increased robustness and/or power savings for a stereo VBC in an XPAN, in accordance with the present disclosure. As shown in FIG. 6A, example 600 includes communication between a handset (or SAP device) that includes a Bluetooth component and a WLAN component, shown as handset BT 605 and handset WLAN 610, a primary (e.g., left) peripheral device that includes a WLAN component and a BT component, shown as primary WLAN 615 and primary BT 620, and a secondary (e.g., right) peripheral device that includes a WLAN component and a BT component, shown as secondary WLAN 625 and secondary BT 630. In some aspects, as described herein, the handset and peripheral devices may communicate to implement an XPAN use case that supports downlink audio and VBC traffic, such as ULL gaming. For example, in some aspects, the primary and secondary peripheral devices may correspond to left and right wireless earbuds (or vice versa)

that can render audio data and are equipped with a microphone or other suitable device that can receive voice data.

In current XPAN implementations, the WLAN component of a handset or SAP device generally uses a two-way exchange including an end of service period (EOSP) indication and a block acknowledgement (BA) with one or more peripheral devices during a TWT SP to determine whether to enter a low power mode. For example, in current XPAN implementations, a peripheral device may transmit an EOSP indication when the peripheral device is finished transmitting uplink VBC packets associated with a current TWT SP, and the SAP device may transmit a BA message to the peripheral device in cases where the uplink VBC packets are successfully received and decoded. In this case, when the BA message is transmitted, the SAP device does not expect any further uplink VBC packets from the peripheral device in the current TWT SP, and can enter a low power mode for the remainder of the TWT SP. However, in cases where the two-way exchange is not completed (e.g., the peripheral device does not transmit VBC packets or an EOSP indication and/or the SAP device does not receive VBC packets or transmit a BA message to the peripheral device), the SAP device generally waits until the end of the current TWT SP before going to sleep. In some cases, this can result in increased power consumption, because downlink audio and uplink VBC use cases can start independently (e.g., the user may start a gaming session and receive downlink audio associated with the gaming session, but may not speak with friends or other players until later). Accordingly, in cases where the VBC use case starts after the downlink audio use case, the SAP device may waste significant power listening for uplink VBC packets that will not arrive because the SAP device needs to anticipate uplink VBC traffic in every TWT SI.

Accordingly, FIG. 6A illustrates an example call flow that uses internal handshaking between the handset BT component 605 and the handset WLAN component 610 to inform the SAP device when a VBC use case is started or stopped. In this way, the handset WLAN component 610 only expects VBC packets from the peripheral devices when the handset BT component 605 explicitly informs the handset WLAN component 610 to expect uplink VBC packets (e.g., when a VBC-related use case is about to start). For example, reference number 632 depicts an initial state of an XPAN use case in which a downlink audio streaming use case is started without a VBC enabled. As further shown in FIG. 6A, and by reference numbers 634-1 and 634-2, the handset WLAN component 610 may then transmit downlink audio packets to the primary WLAN component 615 and the secondary WLAN component 625. As shown by reference number 636, the handset or SAP device does not expect any uplink VBC traffic because the VBC use case has not yet been enabled, whereby the handset or SAP device may enter a low power mode for the remainder of the current TWT SI after transmitting the downlink audio packets. As further shown by reference number 638, the XPAN use case may require that a microphone be enabled (e.g., the user may press a button, speak, or perform another action indicating that voice input is to be provided). Accordingly, as shown by reference number 640, the handset BT component 605 may transmit a message to enable the VBC use case to the handset WLAN component 610. At this point, as shown by reference number 642, the handset WLAN component 610 may start to expect VBC packets and may wait until the maximum TWT SP has elapsed to receive the first VBC packet from either peripheral device. In this case, the handset WLAN component 610 may be consuming power to listen for the first VBC packet until the end of the current TWT SP, but the time period that the handset WLAN component 610 listens for the first VBC packet may be limited to approximately 300-500 ms (e.g., resulting in a negligible power penalty).

As further shown in FIG. 6A, and by reference number 644, the handset BT component 605 may then communicate with the primary BT component 620 to establish a VBC audio path on the peripheral devices. For example, to establish the VBC audio path on the peripheral devices, the handset BT component 605 may transmit a first message to the primary BT component 620 to enable a VBC audio path, the primary BT component 620 may respond to the first message with a generic attribute (GATT) profile message indicating that the VBC audio path is enabled, the handset BT component 605 may transmit a second message to the primary BT component 620 to indicate that the handset BT component 605 is ready to receive VBC traffic, and the primary BT component 620 may respond to the first message with a GATT profile message indicating that the primary BT component 620 is ready to start streaming VBC traffic. As further shown by reference numbers 646-1 and 646-2, the handset WLAN component 610 may then transmit downlink audio packets to the primary WLAN component 615 and the secondary WLAN component 625. As shown by reference number 648, the VBC audio path is established on the peripheral devices, with the primary peripheral device configured to transmit VBC traffic using offset 0 and the secondary peripheral device configured to transmit VBC traffic using offset 1 in cases where the TWT SI periodicity for the VBC traffic is larger than the TWT SI periodicity for the downlink audio traffic. Alternatively, the primary peripheral device and the secondary peripheral device may each transmit VBC traffic using offset 0 in cases where the TWT SI periodicity for the VBC traffic equals the TWT SI periodicity for the downlink audio traffic. In either case, there may be no explicit messaging between the handset or SAP device and the peripheral devices to decide on the offsets, which are instead a function of the TWT SI periodicity used for downlink audio traffic.

As shown by reference number 650, the handset or SAP device may then perform a self-learning algorithm to estimate VBC packet arrival times based on the arrival pattern of incoming VBC packets. For example, the handset or SAP device may determine the TWT SIs in which subsequent VBC packets are expected to be received after the handset or SAP device receives a VBC packet from one or more peripheral devices. For example, for a downlink audio TWT SI periodicity of 4 ms or 8 ms, if the handset or SAP device receives a VBC packet from the primary peripheral device in a TWT SI with an index N and from the secondary peripheral device in a TWT SI with an index N+1, subsequent VBC packets from the primary peripheral device may be received in TWT SIs with indexes of N+i×(16/Service_Interval) and subsequent VBC packets from the secondary peripheral device may be expected in TWT SIs with indexes of N+1+i×(16/Service_Interval), where Service_Interval is the TWT SI periodicity for downlink audio packets (e.g., 4, 8, or 16 ms), and where i has a value that is greater than 0. Alternatively, for a downlink TWT SI of 16 ms, subsequent packets from both earbuds may be expected in TWT SIs with indexes of N+i.

Accordingly, FIG. 6B illustrates a first example scenario 660 where the handset or SAP device starts to listen for uplink VBC packets from the start of an XPAN session that supports a VBC use case, and a second example scenario 670 where the handset or SAP device does not start to listen for uplink VBC packets until the handset WLAN component 610 receives an indication from the handset BT component 605 that a VBC use case has started. As shown in FIG. 6B, in both scenarios 660 and 670, a gaming use case (or other use case) involving downlink audio traffic starts at time $t_0$, a VBC use case involving uplink VBC traffic starts at time $t_1$, and uplink VBC traffic from one or more peripheral devices starts at time $t_2$. In the first example scenario 660, the SAP device has to listen for uplink VBC traffic starting from time $t_0$, when the gaming or other downlink audio use case starts, and has to continue to listen for uplink VBC traffic until the end of the TWT SP even though there is no possibility of receiving uplink VBC traffic any earlier than time $t_2$ (e.g., because the SAP device is unaware of whether to expect VBC traffic in a given TWT SI). As a result, the SAP device wastes power for the time period between time $t_0$ and time $t_2$, when the actual VBC traffic begins. On the other hand, in scenario 670, the handset or SAP device does not start to listen for uplink VBC packets when the downlink audio use case begins at time $t_0$. Instead, the SAP device enters a power saving or low power mode until the handset BT component 605 indicates to the handset WLAN component 610 that the VBC use case has started at time $t_1$. For example, after the SAP device has transmitted an EOSP indication to the peripheral device(s) to indicate that the downlink audio transmissions for the current TWT SP are complete (e.g., following a BA message indicating that the peripheral device(s) successfully received the downlink audio transmissions for the current TWT SP), the SAP device may enter a low power mode for the remainder of the current TWT SP because no uplink VBC traffic is expected. After receiving the indication that the VBC use case has started at time $t_1$, the handset WLAN component 610 may start to listen for VBC traffic from the peripheral device(s), which begins at time $t_2$. Accordingly, rather than wasting power for the duration from time $t_0$ to time $t_2$, the techniques described herein reduce the time period that power is consumed to only span the duration from time $t_1$ to time $t_2$. Furthermore, once VBC traffic has started, the SAP device may use a self-learning algorithm to anticipate subsequent VBC traffic and further adjust the TWT SP to save power.

As indicated above, FIGS. 6A-6B are provided as examples. Other examples may differ from what is described with regard to FIGS. 6A-6B.

FIGS. 7A-7D are diagrams illustrating examples associated with increased robustness and/or power savings for a stereo VBC in an XPAN, in accordance with the present disclosure. As shown in FIGS. 7A-7D, example 700 includes communication between a handset (or SAP device) that includes a Bluetooth component and a WLAN component, shown as handset BT 705 and handset WLAN 710, a primary (e.g., left) peripheral device that includes a WLAN component and a BT component, shown as primary WLAN 715 and primary BT 720, and a secondary (e.g., right) peripheral device that includes a WLAN component and a BT component, shown as secondary WLAN 725 and secondary BT 730. In some aspects, as described herein, the handset and peripheral devices may communicate to perform an XPAN use case that supports downlink audio and VBC traffic, such as ULL gaming. For example, in some aspects, the primary and secondary peripheral devices may correspond to left and right wireless earbuds (or vice versa) that can render audio data and are equipped with a microphone or other suitable device that can receive voice data.

As shown in FIGS. 7A-7D, and by reference numbers 740 and 745, the handset WLAN component 710 may transmit downlink audio data including audio packets associated with a left audio channel and a right audio channel to the primary and secondary peripheral devices at the start of a current TWT SP. After performing any retransmissions of the downlink audio data (not explicitly shown in FIGS. 7A-7D), the handset WLAN component 710 may then expect one or more uplink VBC packet transmissions from the primary WLAN component 715 and the secondary WLAN component 725 in cases where the handset BT component 705 has indicated that a VBC use case has started. For example, the handset WLAN component 710 may determine an arrival pattern for the uplink VBC traffic, and may estimate when to expect a next VBC packet from each peripheral device based on the VBC traffic arrival pattern.

Figure 7A:
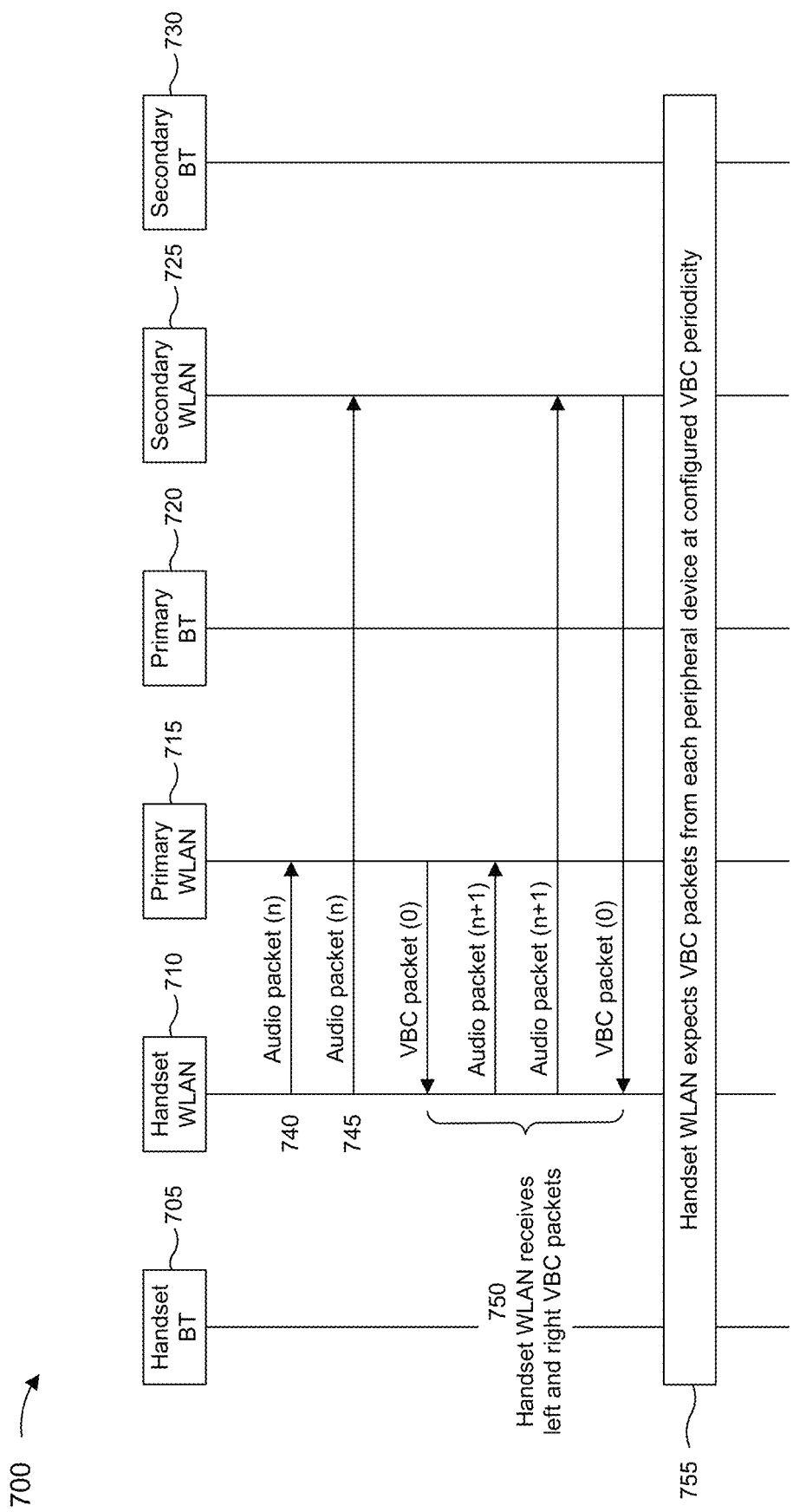
FIGS. 7A-7D are diagrams illustrating examples associated with increased robustness and/or power savings for a stereo VBC in an XPAN, in accordance with the present disclosure.

For example, referring to FIG. 7A, reference number 750 depicts a first scenario, where the handset WLAN component receives a VBC packet from the primary WLAN component 715 in a first TWT SI (e.g., a TWT SI with index N) and receives a VBC packet from the secondary WLAN component 725 in a second TWT SI (e.g., a TWT SI with index N+1). For example, in the scenario depicted in FIG. 7A, the TWT SI periodicity for downlink audio traffic may be less than the TWT SI periodicity for uplink VBC traffic (e.g., 4 or 8 ms), whereby the primary WLAN component 715 may use an offset of 0 and the secondary WLAN component 725 may use an offset of 1 when transmitting uplink VBC packets. Accordingly, as shown by reference number 755, when the handset WLAN component 710 receives left and right VBC packets in consecutive TWT SIs (e.g., TWT SI with index N and TWT SI with index N+1), the handset WLAN component 710 may expect the next VBC packets from the peripheral devices to be received after the configured TWT SI periodicity for VBC traffic (e.g., every 16 ms). In this way, the handset WLAN component 710 may adjust the duration of the TWT SP accordingly for subsequent TWT SIs to save power (e.g., after completing any downlink audio transmissions and retransmissions, until the next VBC packet is expected).

Figure 7B:
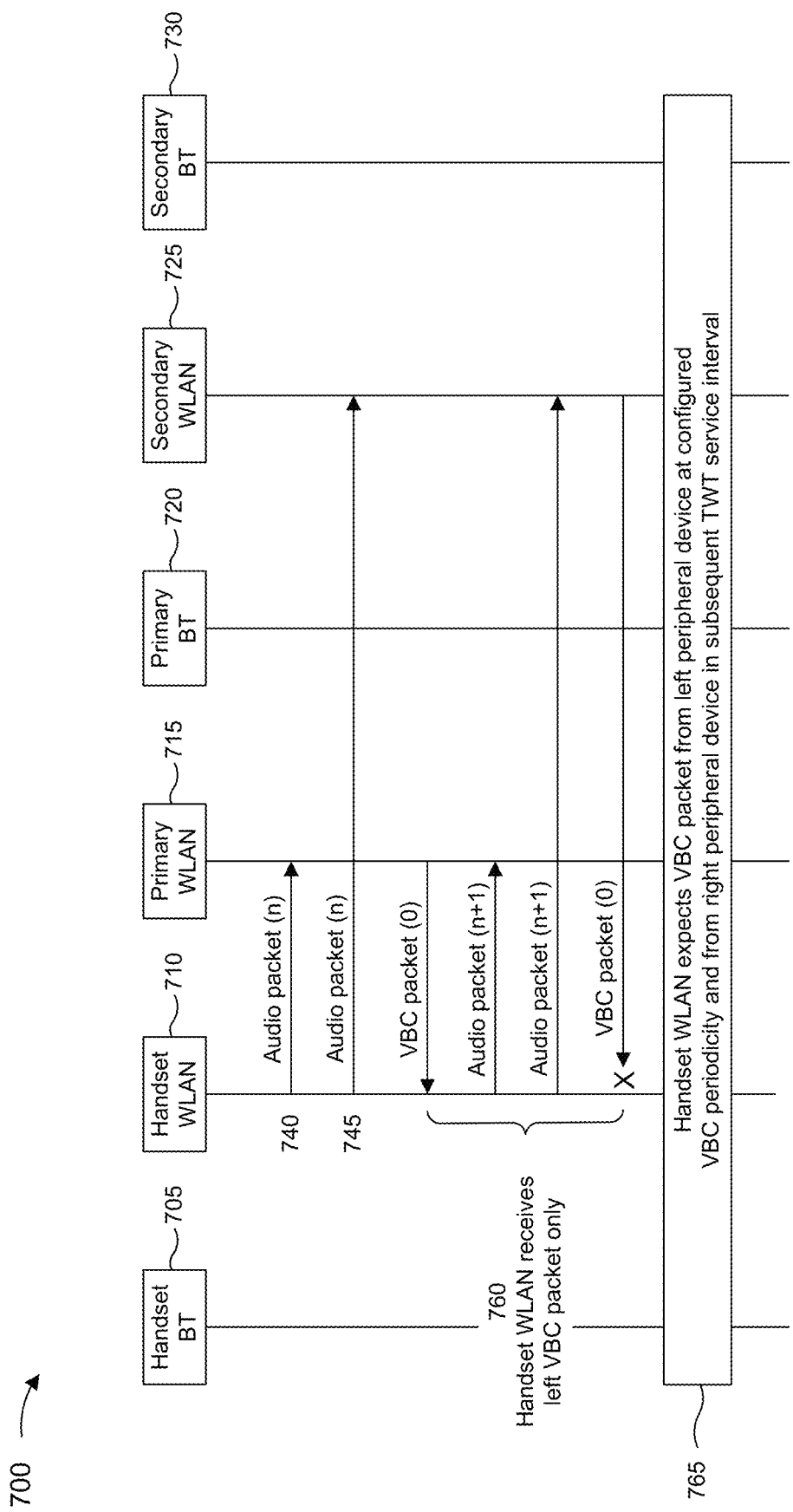

In another example, shown in FIG. 7B, reference number 760 depicts a second scenario, where the handset WLAN component receives a VBC packet from the primary WLAN component 715 in a first TWT SI (e.g., a TWT SI with index N) and does not receive a VBC packet from the secondary WLAN component 725 in a second TWT SI (e.g., a TWT SI with index N+1). For example, when the handset WLAN component 710 receives the VBC packet from the primary WLAN component 715 in a TWT SI with index N, the handset WLAN component 710 may assume that the TWT SI is associated with a $0^{th}$ offset (e.g., because the primary WLAN component 715 uses an offset of 0, as described herein). The handset WLAN component 710 then expects a VBC packet from the secondary WLAN component 725 in a next TWT SI (e.g., with an offset of 1), but does not receive the VBC packet. Nonetheless, the handset WLAN component 710 can still assume that VBC packets from the secondary peripheral device will arrive at the configured periodicity for VBC traffic (e.g., every 16 ms). Accordingly, as shown by reference number 765, the handset WLAN component 710 may expect a next VBC packet from the primary peripheral device 16 ms after the most recent VBC packet received from the primary peripheral device, and may expect a next VBC packet from the secondary peripheral device in the TWT SI that immediately follows the TWT SI in which the next VBC packet from the primary peripheral device is expected (e.g., 4 or 8 ms after the next VBC packet from the primary peripheral device, depending on the TWT SI periodicity for downlink audio traffic).

Figure 7C:
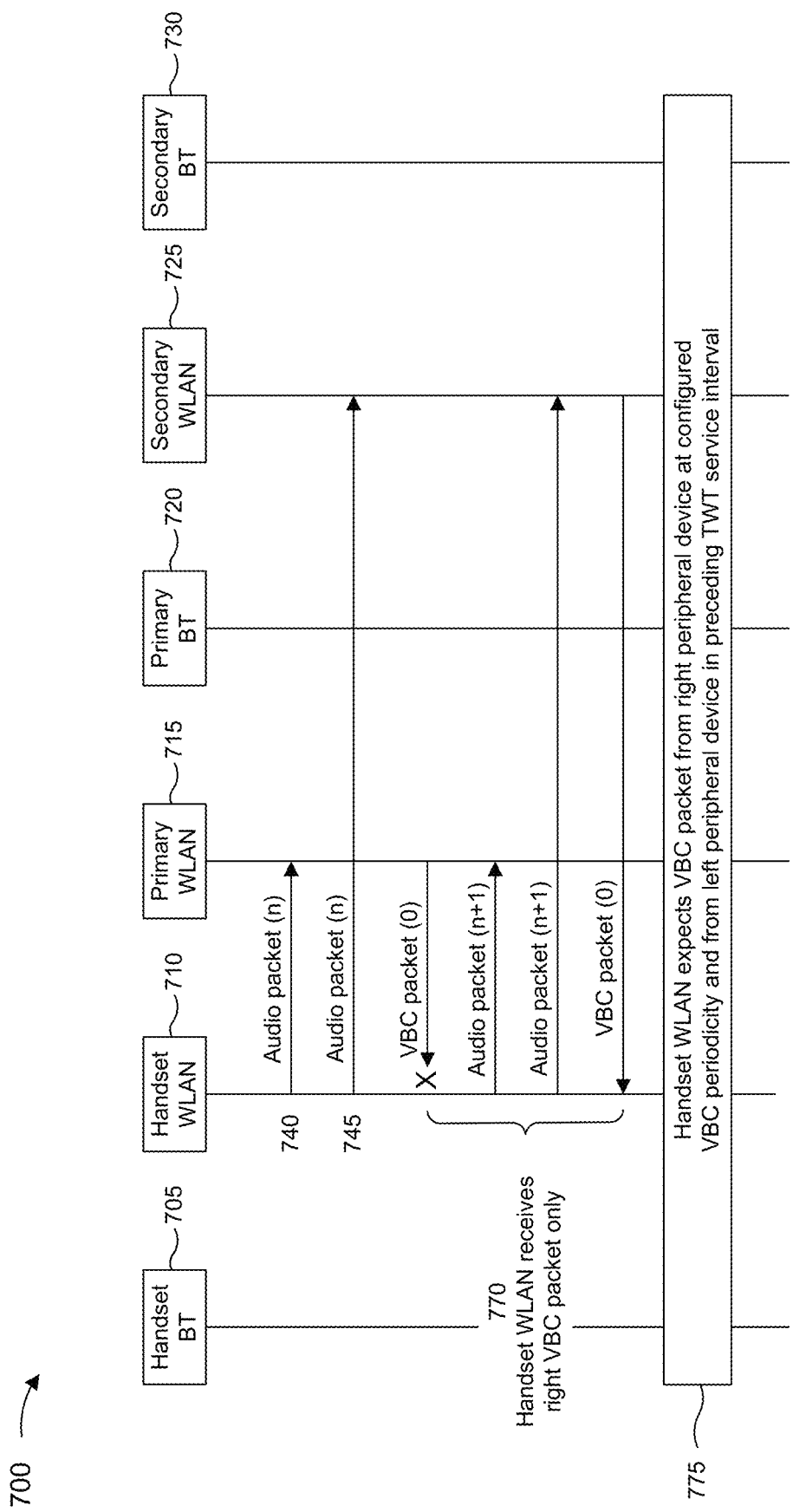

In another example, shown in FIG. 7C, reference number 770 depicts a third scenario, where the handset WLAN component receives a VBC packet from the secondary WLAN component 725, which is assumed to be associated with an offset of 1. The handset WLAN component 710 expected a VBC packet from the primary WLAN component 715 in the preceding TWT SI, but did not receive a VBC packet from the primary WLAN component 715. Nonetheless, the handset WLAN component 710 can still assume that VBC packets from the primary peripheral device will arrive at the configured periodicity for VBC traffic (e.g., every 16 ms). Accordingly, as shown by reference number 775, the handset WLAN component 710 may expect a next VBC packet from the secondary peripheral device 16 ms after the most recent VBC packet received from the second peripheral device, and may expect a next VBC packet from the primary peripheral device in the TWT SI that immediately precedes the TWT SI in which the next VBC packet from the primary peripheral device is expected (e.g., 4 or 8 ms prior to the next VBC packet from the secondary peripheral device, depending on the TWT SI periodicity for downlink audio traffic).

Figure 7D:
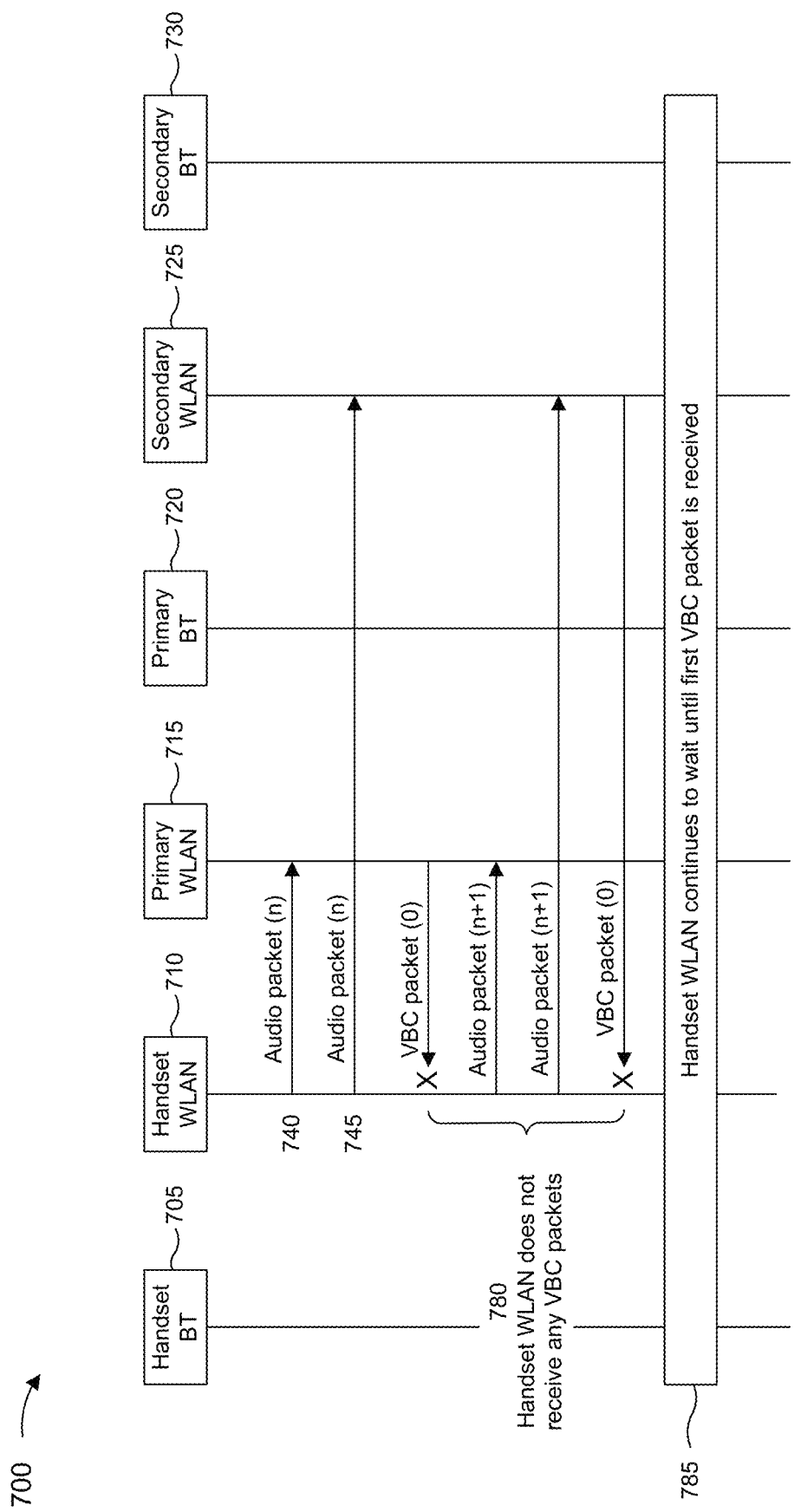

In another example, referring to FIG. 7D, reference number 780 depicts a fourth scenario, where the handset WLAN component does not receive VBC packets from the primary WLAN component 715 or the secondary WLAN component 725 in a current TWT SI. In this case, as shown by reference number 785, the handset WLAN component 710 continues to listen for VBC packets from the primary WLAN component 715 and/or the secondary WLAN component 725 until the first VBC packet is received or the maximum duration of the TWT SP has elapsed. After the first VBC packet is received, the handset WLAN 710 may perform the self-learning algorithm to determine the incoming VBC traffic pattern and adjust the duration of the TWT SP for subsequent TWT SIs in a similar manner as described above for FIGS. 7A-7C.

As indicated above, FIGS. 7A-7D are provided as examples. Other examples may differ from what is described with regard to FIGS. 7A-7D.

Figure 8:
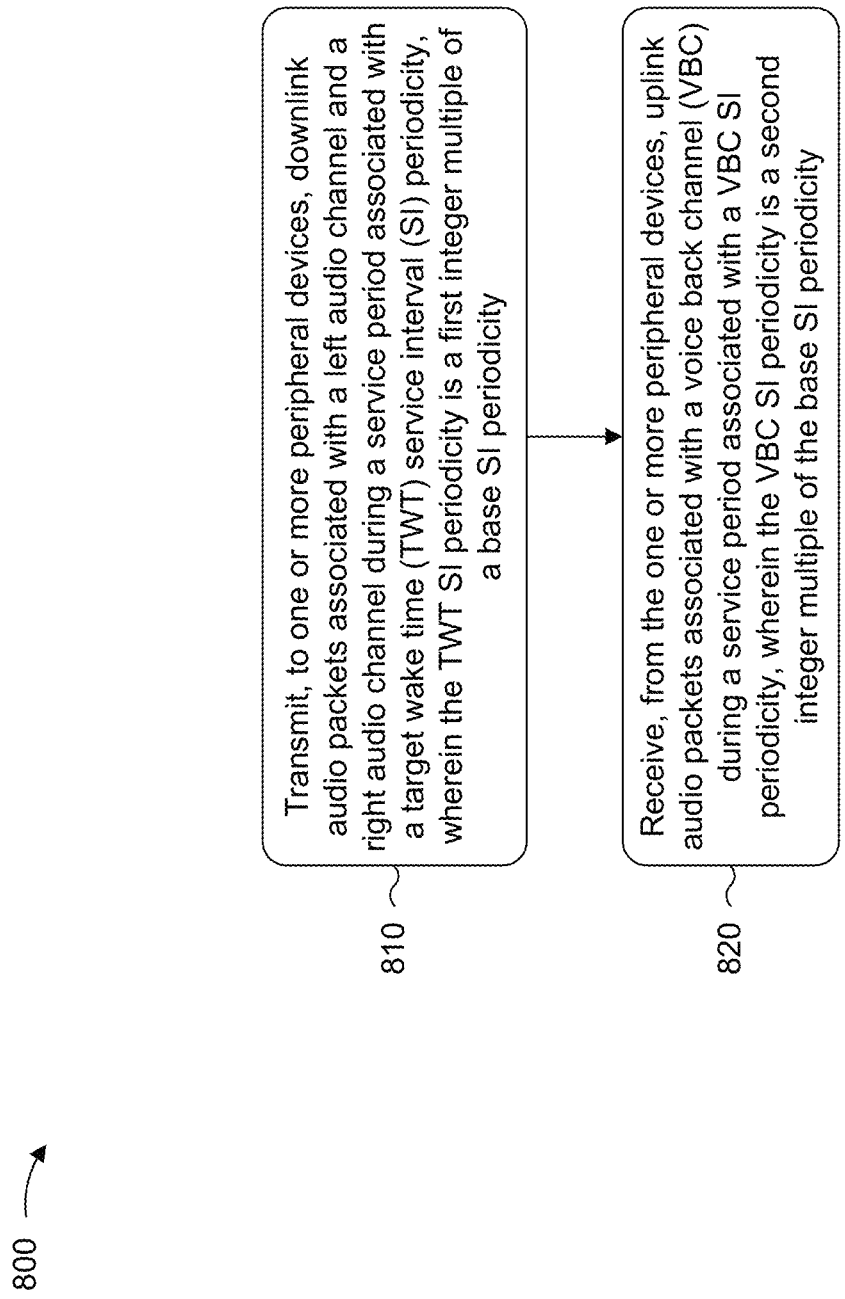
FIG. 8 is a diagram illustrating an example process performed, for example, by a wireless communication device, in accordance with the present disclosure.

FIG. 8 is a diagram illustrating an example process 800 performed, for example, by a wireless communication device, in accordance with the present disclosure. Example process 800 is an example where the wireless communication device (e.g., (e.g., access point 105, device 115, wireless communication device 300, or the like) performs operations associated with increased robustness and power saving for a stereo VBC in an XPAN.

As shown in FIG. 8, in some aspects, process 800 may include transmitting, to one or more peripheral devices, downlink audio packets associated with a left audio channel and a right audio channel during a service period associated with a TWT SI periodicity, wherein the TWT SI periodicity is a first integer multiple of a base SI periodicity (block 810). For example, the wireless communication device (e.g., using transmission component 904 and/or communication manager 906, depicted in FIG. 9) may transmit, to one or more peripheral devices, downlink audio packets associated with a left audio channel and a right audio channel during a service period associated with a TWT SI periodicity, wherein the TWT SI periodicity is a first integer multiple of a base SI periodicity, as described above.

As further shown in FIG. 8, in some aspects, process 800 may include receiving, from the one or more peripheral devices, uplink audio packets associated with a VBC during a service period associated with a VBC SI periodicity, wherein the VBC SI periodicity is a second integer multiple of the base SI periodicity (block 820). For example, the wireless communication device (e.g., using reception component 902 and/or communication manager 906, depicted in FIG. 9) may receive, from the one or more peripheral devices, uplink audio packets associated with a VBC during a service period associated with a VBC SI periodicity, wherein the VBC SI periodicity is a second integer multiple of the base SI periodicity, as described above.

Process 800 may include additional aspects, such as any single aspect or any combination of aspects described below and/or in connection with one or more other processes described elsewhere herein.

In a first aspect, receiving the uplink audio packets associated with the VBC includes receiving a VBC packet associated with a left VBC in a first TWT SI associated with a first offset relative to a VBC SI, and receiving a VBC packet associated with a right VBC in a second TWT SI associated with a second offset relative to the VBC SI.

In a second aspect, alone or in combination with the first aspect, the VBC packet associated with the left VBC and the VBC packet associated with the right VBC are associated with different offsets based at least in part on the VBC SI periodicity exceeding the TWT SI periodicity.

In a third aspect, alone or in combination with one or more of the first and second aspects, receiving the uplink audio packets associated with the VBC includes retransmitting, to the one or more peripheral devices, a downlink audio packet associated with one or more of the left audio channel or the right audio channel during the service period associated with the TWT SI periodicity, wherein the service period associated with the TWT SI periodicity is separate from the service period associated with the VBC SI periodicity.

In a fourth aspect, alone or in combination with one or more of the first through third aspects, the first TWT SI includes a first time period that is available for one or more retransmissions of the VBC packet associated with the left VBC, and the second TWT SI includes a second time period that is available for one or more retransmissions of the VBC packet associated with the right VBC.

In a fifth aspect, alone or in combination with one or more of the first through fourth aspects, receiving the uplink audio packets associated with the VBC includes receiving a VBC packet associated with a left VBC and a VBC packet associated with a right VBC in non-overlapping time periods within a single TWT SI.

In a sixth aspect, alone or in combination with one or more of the first through fifth aspects, the VBC packet associated with the left VBC and the VBC packet associated with the right VBC are received within a single TWT SI based at least in part on the VBC SI periodicity equaling the TWT SI periodicity.

In a seventh aspect, alone or in combination with one or more of the first through sixth aspects, process 800 includes determining an arrival pattern for the uplink audio packets, adjusting a duration of the service period associated with the VBC SI periodicity based at least in part on the arrival pattern for the uplink audio packets, and entering a sleep mode after the duration of the service period.

In an eighth aspect, alone or in combination with one or more of the first through seventh aspects, the arrival pattern for the uplink audio packets includes receiving, in a first TWT SI, a first VBC packet from a primary peripheral device and receiving, in a second TWT SI that immediately follows the first TWT SI, a second VBC packet from a secondary peripheral device.

In a ninth aspect, alone or in combination with one or more of the first through eighth aspects, the arrival pattern for the uplink audio packets includes receiving a first VBC packet from a primary peripheral device in a first TWT SI without receiving a second VBC packet from a secondary peripheral device in a second TWT SI that immediately follows the first TWT SI.

In a tenth aspect, alone or in combination with one or more of the first through ninth aspects, the arrival pattern for the uplink audio packets includes receiving a first VBC packet from a secondary peripheral device in a first TWT SI without receiving a second VBC packet from a primary peripheral device in a second TWT SI that immediately precedes the first TWT SI.

In an eleventh aspect, alone or in combination with one or more of the first through tenth aspects, the duration of the service period is set to a maximum supported value for the duration of the service period until a first VBC packet is received.

In a twelfth aspect, alone or in combination with one or more of the first through eleventh aspects, the arrival pattern for the uplink audio packets is determined based at least in part on an indication that a VBC use case has started.

In a thirteenth aspect, alone or in combination with one or more of the first through twelfth aspects, process 800 includes operating, until an indication that a VBC use case has started, in a power saving mode during a portion of one or more TWT SIs allocated to listening for the uplink audio packets.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
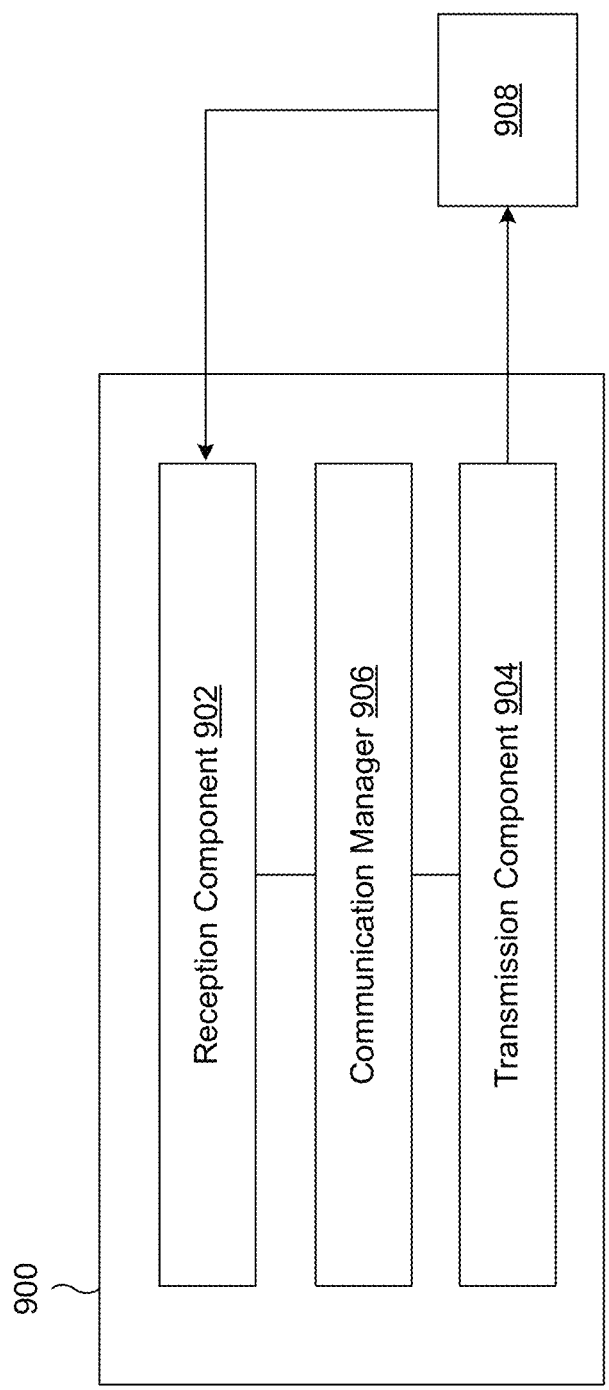
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a wireless communication device, or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 908 (such as a peripheral device and/or another wireless communication device) using the reception component 902 and the transmission component 904. As further shown, the apparatus 900 may include the communication manager 906.

In some aspects, the apparatus 900 may be configured to perform one or more operations described herein. Additionally, or alternatively, the apparatus 900 may be configured to perform one or more processes described herein, such as process 800 of FIG. 8. In some aspects, the apparatus 900 and/or one or more components shown in FIG. 9 may include one or more components of the device described in connection with FIG. 3. Additionally, or alternatively, one or more components shown in FIG. 9 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a multiple input multiple output (MIMO) detector, a receive processor, a controller/processor, a memory, or a combination thereof, of the wireless communication device.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the wireless communication device. In some aspects, the transmission component 904 may be co-located with the reception component 902 in a transceiver.

The transmission component 904 may transmit, to one or more peripheral devices, downlink audio packets associated with a left audio channel and a right audio channel during a service period associated with a TWT SI periodicity, wherein the TWT SI periodicity is a first integer multiple of a base SI periodicity. The reception component 902 may receive, from the one or more peripheral devices, uplink audio packets associated with a VBC during a service period associated with a VBC SI periodicity, wherein the VBC SI periodicity is a second integer multiple of the base SI periodicity.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a wireless communication device, comprising: transmitting, to one or more peripheral devices, downlink audio packets associated with a left audio channel and a right audio channel during a service period associated with a TWT SI periodicity, wherein the TWT SI periodicity is a first integer multiple of a base SI periodicity; and receiving, from the one or more peripheral devices, uplink audio packets associated with a VBC during a service period associated with a VBC SI periodicity, wherein the VBC SI periodicity is a second integer multiple of the base SI periodicity.

Aspect 2: The method of Aspect 1, wherein receiving the uplink audio packets associated with the VBC includes: receiving a VBC packet associated with a left VBC in a first TWT SI associated with a first offset relative to a VBC SI; and receiving a VBC packet associated with a right VBC in a second TWT SI associated with a second offset relative to the VBC SI.

Aspect 3: The method of Aspect 2, wherein the VBC packet associated with the left VBC and the VBC packet associated with the right VBC are associated with different offsets based at least in part on the VBC SI periodicity exceeding the TWT SI periodicity.

Aspect 4: The method of Aspect 2, wherein receiving the uplink audio packets associated with the VBC includes: retransmitting, to the one or more peripheral devices, a downlink audio packet associated with one or more of the left audio channel or the right audio channel during the service period associated with the TWT SI periodicity, wherein the service period associated with the TWT SI periodicity is separate from the service period associated with the VBC SI periodicity.

Aspect 5: The method of Aspect 2, wherein the first TWT SI includes a first time period that is available for one or more retransmissions of the VBC packet associated with the left VBC, and the second TWT SI includes a second time period that is available for one or more retransmissions of the VBC packet associated with the right VBC.

Aspect 6: The method of any of Aspects 1-5, wherein receiving the uplink audio packets associated with the VBC includes: receiving a VBC packet associated with a left VBC and a VBC packet associated with a right VBC in non-overlapping time periods within a single TWT SI.

Aspect 7: The method of Aspect 6, wherein the VBC packet associated with the left VBC and the VBC packet associated with the right VBC are received within a single TWT SI based at least in part on the VBC SI periodicity equaling the TWT SI periodicity.

Aspect 8: The method of any of Aspects 1-7, further comprising: determining an arrival pattern for the uplink audio packets; adjusting a duration of the service period associated with the VBC SI periodicity based at least in part on the arrival pattern for the uplink audio packets; and entering a sleep mode after the duration of the service period.

Aspect 9: The method of Aspect 8, wherein the arrival pattern for the uplink audio packets includes receiving, in a first TWT SI, a first VBC packet from a primary peripheral device and receiving, in a second TWT SI that immediately follows the first TWT SI, a second VBC packet from a secondary peripheral device.

Aspect 10: The method of Aspect 8, wherein the arrival pattern for the uplink audio packets includes receiving a first VBC packet from a primary peripheral device in a first TWT SI without receiving a second VBC packet from a secondary peripheral device in a second TWT SI that immediately follows the first TWT SI.

Aspect 11: The method of Aspect 8, wherein the arrival pattern for the uplink audio packets includes receiving a first VBC packet from a secondary peripheral device in a first TWT SI without receiving a second VBC packet from a primary peripheral device in a second TWT SI that immediately precedes the first TWT SI.

Aspect 12: The method of Aspect 8, wherein the duration of the service period is set to a maximum supported value for the duration of the service period until a first VBC packet is received.

Aspect 13: The method of Aspect 8, wherein the arrival pattern for the uplink audio packets is determined based at least in part on an indication that a VBC use case has started.

Aspect 14: The method of any of Aspects 1-13, further comprising: operating, until an indication that a VBC use case has started, in a power saving mode during a portion of one or more TWT SIs allocated to listening for the uplink audio packets.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
    transmitting, to one or more peripheral devices, downlink audio packets associated with a left audio channel and a right audio channel during a service period associated with a target wake time (TWT) service interval (SI) periodicity, wherein the TWT SI periodicity is a first integer multiple of a base SI periodicity; and
    receiving, from the one or more peripheral devices, uplink audio packets associated with a voice back channel (VBC) during a service period associated with a VBC SI periodicity, wherein the VBC SI periodicity is a second integer multiple of the base SI periodicity.

2. The method of claim 1, wherein receiving the uplink audio packets associated with the VBC includes:
    receiving a VBC packet associated with a left VBC in a first TWT SI associated with a first offset relative to a VBC SI; and
    receiving a VBC packet associated with a right VBC in a second TWT SI associated with a second offset relative to the VBC SI.

3. The method of claim 2, wherein the VBC packet associated with the left VBC and the VBC packet associated with the right VBC are associated with different offsets based at least in part on the VBC SI periodicity exceeding the TWT SI periodicity.

4. The method of claim 2, wherein receiving the uplink audio packets associated with the VBC includes:
    retransmitting, to the one or more peripheral devices, a downlink audio packet associated with one or more of the left audio channel or the right audio channel during the service period associated with the TWT SI periodicity, wherein the service period associated with the TWT SI periodicity is separate from the service period associated with the VBC SI periodicity.

5. The method of claim 2, wherein the first TWT SI includes a first time period that is available for one or more retransmissions of the VBC packet associated with the left VBC, and the second TWT SI includes a second time period that is available for one or more retransmissions of the VBC packet associated with the right VBC.

6. The method of claim 1, wherein receiving the uplink audio packets associated with the VBC includes:
    receiving a VBC packet associated with a left VBC and a VBC packet associated with a right VBC in non-overlapping time periods within a single TWT SI.

7. The method of claim 6, wherein the VBC packet associated with the left VBC and the VBC packet associated with the right VBC are received within a single TWT SI based at least in part on the VBC SI periodicity equaling the TWT SI periodicity.

8. The method of claim 1, further comprising:
    determining an arrival pattern for the uplink audio packets;
    adjusting a duration of the service period associated with the VBC SI periodicity based at least in part on the arrival pattern for the uplink audio packets; and
    entering a sleep mode after the duration of the service period.

9. The method of claim 8, wherein the arrival pattern for the uplink audio packets includes receiving, in a first TWT SI, a first VBC packet from a primary peripheral device and receiving, in a second TWT SI that immediately follows the first TWT SI, a second VBC packet from a secondary peripheral device.

10. The method of claim 8, wherein the arrival pattern for the uplink audio packets includes receiving a first VBC packet from a primary peripheral device in a first TWT SI without receiving a second VBC packet from a secondary peripheral device in a second TWT SI that immediately follows the first TWT SI.

11. The method of claim 8, wherein the arrival pattern for the uplink audio packets includes receiving a first VBC packet from a secondary peripheral device in a first TWT SI without receiving a second VBC packet from a primary peripheral device in a second TWT SI that immediately precedes the first TWT SI.

12. The method of claim 8, wherein the duration of the service period is set to a maximum supported value for the duration of the service period until a first VBC packet is received.

13. The method of claim 8, wherein the arrival pattern for the uplink audio packets is determined based at least in part on an indication that a VBC use case has started.

14. The method of claim 1, further comprising:
    operating, until an indication that a VBC use case has started, in a power saving mode during a portion of one or more TWT SIs allocated to listening for the uplink audio packets.

15. A wireless communication device, comprising:
    a memory; and
    one or more processors, coupled to the memory, configured to:
        transmit, to one or more peripheral devices, downlink audio packets associated with a left audio channel and a right audio channel during a service period associated with a target wake time (TWT) service interval (SI) periodicity, wherein the TWT SI periodicity is a first integer multiple of a base SI periodicity; and receive, from the one or more peripheral devices, uplink audio packets associated with a voice back channel (VBC) during a service period associated with a VBC SI periodicity, wherein the VBC SI periodicity is a second integer multiple of the base SI periodicity.

16. The wireless communication device of claim 15, wherein the one or more processors, to receive the uplink audio packets associated with the VBC, are configured to:

receive a VBC packet associated with a left VBC in a first TWT SI associated with a first offset relative to a VBC SI; and receive a VBC packet associated with a right VBC in a second TWT SI associated with a second offset relative to the VBC SI.

17. The wireless communication device of claim 16, wherein the VBC packet associated with the left VBC and the VBC packet associated with the right VBC are associated with different offsets based at least in part on the VBC SI periodicity exceeding the TWT SI periodicity.

18. The wireless communication device of claim 16, wherein the one or more processors, to receive the uplink audio packets associated with the VBC, are configured to:

retransmit, to the one or more peripheral devices, a downlink audio packet associated with one or more of the left audio channel or the right audio channel during the service period associated with the TWT SI periodicity, wherein the service period associated with the TWT SI periodicity is separate from the service period associated with the VBC SI periodicity.

19. The wireless communication device of claim 16, wherein the first TWT SI includes a first time period that is available for one or more retransmissions of the VBC packet associated with the left VBC, and the second TWT SI includes a second time period that is available for one or more retransmissions of the VBC packet associated with the right VBC.

20. The wireless communication device of claim 15, wherein the one or more processors, to receive the uplink audio packets associated with the VBC, are configured to:

receive a VBC packet associated with a left VBC and a VBC packet associated with a right VBC in non-overlapping time periods within a single TWT SI.

21. The wireless communication device of claim 20, wherein the VBC packet associated with the left VBC and the VBC packet associated with the right VBC are received within a single TWT SI based at least in part on the VBC SI periodicity equaling the TWT SI periodicity.

22. The wireless communication device of claim 15, wherein the one or more processors are further configured to:

determine an arrival pattern for the uplink audio packets;
adjust a duration of the service period associated with the VBC SI periodicity based at least in part on the arrival pattern for the uplink audio packets; and
enter a sleep mode after the duration of the service period.

23. The wireless communication device of claim 22, wherein the arrival pattern for the uplink audio packets includes receiving, in a first TWT SI, a first VBC packet from a primary peripheral device and receiving, in a second TWT SI that immediately follows the first TWT SI, a second VBC packet from a secondary peripheral device.

24. The wireless communication device of claim 22, wherein the arrival pattern for the uplink audio packets includes receiving a first VBC packet from a primary peripheral device in a first TWT SI without receiving a second VBC packet from a secondary peripheral device in a second TWT SI that immediately follows the first TWT SI.

25. The wireless communication device of claim 22, wherein the arrival pattern for the uplink audio packets includes receiving a first VBC packet from a secondary peripheral device in a first TWT SI without receiving a second VBC packet from a primary peripheral device in a second TWT SI that immediately precedes the first TWT SI.

26. The wireless communication device of claim 22, wherein the duration of the service period is set to a maximum supported value for the duration of the service period until a first VBC packet is received.

27. The wireless communication device of claim 22, wherein the arrival pattern for the uplink audio packets is determined based at least in part on an indication that a VBC use case has started.

28. The wireless communication device of claim 15, wherein the one or more processors are further configured to:

operate, until an indication that a VBC use case has started, in a power saving mode during a portion of one or more TWT SIs allocated to listening for the uplink audio packets.

29. A non-transitory computer-readable medium storing a set of instructions for wireless communication, the set of instructions comprising:

one or more instructions that, when executed by one or more processors of a wireless communication device, cause the wireless communication device to:

transmit, to one or more peripheral devices, downlink audio packets associated with a left audio channel and a right audio channel during a service period associated with a target wake time (TWT) service interval (SI) periodicity, wherein the TWT SI periodicity is a first integer multiple of a base SI periodicity; and receive, from the one or more peripheral devices, uplink audio packets associated with a voice back channel (VBC) during a service period associated with a VBC SI periodicity, wherein the VBC SI periodicity is a second integer multiple of the base SI periodicity.

30. An apparatus for wireless communication, comprising:

means for transmitting, to one or more peripheral devices, downlink audio packets associated with a left audio channel and a right audio channel during a service period associated with a target wake time (TWT) service interval (SI) periodicity, wherein the TWT SI periodicity is a first integer multiple of a base SI periodicity; and means for receiving, from the one or more peripheral devices, uplink audio packets associated with a voice back channel (VBC) during a service period associated with a VBC SI periodicity, wherein the VBC SI periodicity is a second integer multiple of the base SI periodicity.

* * * * *